(12) United States Patent
Yeung et al.

(10) Patent No.: US 11,015,536 B2
(45) Date of Patent: May 25, 2021

(54) METHODS AND SYSTEMS FOR SUPPLYING FUEL TO GAS TURBINE ENGINES

(71) Applicant: BJ Energy Solutions, LLC, Houston, TX (US)

(72) Inventors: Tony Yeung, Tomball, TX (US); Ricardo Rodriguez-Ramon, Tomball, TX (US); Joseph Foster, Tomball, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

(21) Appl. No.: 15/929,768

(22) Filed: May 21, 2020

(65) Prior Publication Data

US 2021/0079852 A1    Mar. 18, 2021

Related U.S. Application Data

(60) Provisional application No. 62/899,966, filed on Sep. 13, 2019, provisional application No. 62/704,395, filed on May 8, 2020.

(51) Int. Cl.
*F02C 9/00* (2006.01)
*F02C 9/40* (2006.01)
(Continued)

(52) U.S. Cl.
CPC .............. *F02C 9/40* (2013.01); *F02C 7/232* (2013.01); *F02C 7/236* (2013.01); *F02C 9/42* (2013.01);
(Continued)

(58) Field of Classification Search
CPC ...... F02C 9/40; F02C 9/42; F02C 9/07; F02C 9/232; F02C 9/236; F02C 9/228;
(Continued)

(56) References Cited

U.S. PATENT DOCUMENTS 2,498,229 A    2/1950 Adler
3,191,517 A    6/1965 Solzman
(Continued)

FOREIGN PATENT DOCUMENTS

CA    2876687 A1    5/2014
CA    2693567       9/2014
(Continued)

OTHER PUBLICATIONS

ResearchGate, Answer by Byron Woolridge, found at https://www.researchgate.net/post/How_can_we_improve_the_efficiency_of_the_gas_turbine_cycles, Jan. 1, 2013.
(Continued)

*Primary Examiner* — Todd E Manahan
*Assistant Examiner* — Edwin Kang
(74) *Attorney, Agent, or Firm* — Womble Bond Dickinson (US) LLP

(57) ABSTRACT

Methods and systems for supply of fuel for a turbine-driven fracturing pump system used in hydraulic fracturing may be configured to identify when the supply pressure of primary fuel to a plurality of gas turbine engines of a plurality of hydraulic fracturing units falls below a set point, identify a gas turbine engine of the fleet of hydraulic fracturing units operating on primary fuel with highest amount of secondary fuel available, and to selectively transfer the gas turbine engine operating on primary fuel with the highest amount of secondary fuel from primary fuel operation to secondary fuel operation. Some methods and systems may be configured to transfer all gas turbine engines to secondary fuel operation and individually and/or sequentially restore operation to primary fuel operation and/or to manage primary fuel operation and/or secondary fuel operation for portions of the plurality of gas turbine engines.

15 Claims, 11 Drawing Sheets

(51) Int. Cl.
  *F02C 9/42* (2006.01)
  *F02C 7/236* (2006.01)
  *F02C 7/232* (2006.01)
  *F02D 41/22* (2006.01)

(52) U.S. Cl.
  CPC .............. *F02D 2041/224* (2013.01); *F02D 2200/0602* (2013.01); *F05D 2270/3015* (2013.01); *F05D 2270/31* (2013.01); *F23N 2241/20* (2020.01)

(58) Field of Classification Search
  CPC .. F02C 6/00; F23N 2241/20; F02D 2041/224; F02D 2200/0602; F05D 2270/3015; F05D 2270/31; F05D 2270/13; E21B 43/26; E21B 41/0085; B67D 7/0401; B67D 7/36
  See application file for complete search history.

(56) References Cited

U.S. PATENT DOCUMENTS

| | | |
|---|---|---|
| 3,257,031 A | 6/1966 | Dietz |
| 3,378,074 A | 4/1968 | Kiel |
| 3,739,872 A | 6/1973 | McNair |
| 3,773,438 A | 11/1973 | Hall et al. |
| 3,791,682 A | 2/1974 | Mitchell |
| 3,796,045 A | 3/1974 | Foster |
| 3,820,922 A | 6/1974 | Buse et al. |
| 4,010,613 A | 3/1977 | McInerney |
| 4,031,407 A | 6/1977 | Reed |
| 4,086,976 A | 5/1978 | Holm et al. |
| 4,222,229 A | 9/1980 | Uram |
| 4,269,569 A | 5/1981 | Hoover |
| 4,311,395 A | 1/1982 | Douthitt et al. |
| 4,357,027 A | 11/1982 | Zeitlow |
| 4,402,504 A | 9/1983 | Christian |
| 4,457,325 A | 7/1984 | Green |
| 4,470,771 A | 9/1984 | Hall et al. |
| 4,574,880 A | 3/1986 | Handke |
| 4,754,607 A | 7/1988 | Mackay |
| 4,782,244 A | 11/1988 | Wakimoto |
| 4,796,777 A | 1/1989 | Keller |
| 4,913,625 A | 4/1990 | Gerlowski |
| 4,983,259 A | 1/1991 | Duncan |
| 4,990,058 A | 2/1991 | Eslinger |
| 5,537,813 A | 7/1996 | Davis et al. |
| 5,553,514 A | 9/1996 | Walkowc |
| 5,560,195 A | 10/1996 | Anderson et al. |
| 5,622,245 A | 4/1997 | Reik |
| 5,651,400 A | 7/1997 | Corts et al. |
| 5,678,460 A | 10/1997 | Walkowc |
| 5,717,172 A | 2/1998 | Griffin, Jr. et al. |
| 5,983,962 A | 11/1999 | Gerardot |
| 6,041,856 A | 3/2000 | Thrasher et al. |
| 6,050,080 A | 4/2000 | Horner |
| 6,071,188 A | 6/2000 | O'Neill et al. |
| 6,123,751 A | 9/2000 | Nelson et al. |
| 6,129,335 A | 10/2000 | Yokogi |
| 6,145,318 A | 11/2000 | Kaplan et al. |
| 6,279,309 B1 | 8/2001 | Lawlor, II et al. |
| 6,321,860 B1 | 11/2001 | Reddoch |
| 6,334,746 B1 | 1/2002 | Nguyen et al. |
| 6,530,224 B1 | 3/2003 | Conchieri |
| 6,543,395 B2 | 4/2003 | Green |
| 6,655,922 B1 | 12/2003 | Flek |
| 6,765,304 B2 | 7/2004 | Baten et al. |
| 6,786,051 B2 | 9/2004 | Kristich et al. |
| 6,851,514 B2 | 2/2005 | Han et al. |
| 6,859,740 B2 | 2/2005 | Stephenson et al. |
| 6,901,735 B2 | 6/2005 | Lohn |
| 7,065,953 B1 | 6/2006 | Kopko |
| 7,222,015 B2 | 5/2007 | Davis et al. |
| 7,388,303 B2 | 6/2008 | Seiver |
| 7,545,130 B2 | 6/2009 | Latham |
| 7,552,903 B2 | 6/2009 | Dunn et al. |
| 7,563,076 B2 | 7/2009 | Brunet et al. |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,845,413 B2 | 12/2010 | Shampine et al. |
| 7,900,724 B2 | 3/2011 | Promersberger et al. |
| 7,921,914 B2 | 4/2011 | Bruins et al. |
| 7,938,151 B2 | 5/2011 | Höckner |
| 7,980,357 B2 | 7/2011 | Edwards |
| 8,083,504 B2 | 12/2011 | Williams et al. |
| 8,186,334 B2 | 5/2012 | Ooyama |
| 8,196,555 B2 | 6/2012 | Ikeda et al. |
| 8,316,936 B2 | 11/2012 | Roddy et al. |
| 8,414,673 B2 | 4/2013 | Raje et al. |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,672,606 B2 | 3/2014 | Glynn et al. |
| 8,714,253 B2 | 5/2014 | Sherwood et al. |
| 8,770,329 B2 | 7/2014 | Spitler |
| 8,789,601 B2 | 7/2014 | Broussard et al. |
| 8,794,307 B2 | 8/2014 | Coquilleau et al. |
| 8,851,441 B2 | 10/2014 | Acuna et al. |
| 8,905,056 B2 | 12/2014 | Kendrick |
| 8,973,560 B2 | 3/2015 | Krug |
| 8,997,904 B2 | 4/2015 | Cryer et al. |
| 9,032,620 B2 | 5/2015 | Frassinelli et al. |
| 9,057,247 B2 | 6/2015 | Kumar et al. |
| 9,103,193 B2 | 8/2015 | Coli et al. |
| 9,121,257 B2 | 9/2015 | Coli et al. |
| 9,140,110 B2 | 9/2015 | Coli et al. |
| 9,187,982 B2 | 11/2015 | Dehring et al. |
| 9,212,643 B2 | 12/2015 | Deliyski |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oering et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,879,609 B1 | 1/2018 | Crowe et al. |
| 9,893,500 B2 | 2/2018 | Oehring et al. |
| 9,893,660 B2 | 2/2018 | Peterson et al. |
| 9,920,615 B2 | 3/2018 | Zhang et al. |

(56) References Cited

U.S. PATENT DOCUMENTS

| | | |
|---|---|---|
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,018,096 B2 | 7/2018 | Wallimann et al. |
| 10,020,711 B2 | 7/2018 | Oehring et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,349 B2 | 8/2018 | Álvarez et al. |
| 10,082,137 B2 | 9/2018 | Graham et al. |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,134,257 B2 | 11/2018 | Zhang et al. |
| 10,151,244 B2 | 12/2018 | Giancotti et al. |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,303,190 B2 | 5/2019 | Shock |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,526,882 B2 | 1/2020 | Oehring et al. |
| 10,563,649 B2 | 2/2020 | Zhang et al. |
| 10,577,910 B2 | 3/2020 | Stephenson |
| 10,598,258 B2 | 3/2020 | Oehring et al. |
| 10,610,842 B2 | 4/2020 | Chong |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,865,624 B1 | 12/2020 | Cui et al. |
| 10,865,631 B1 | 12/2020 | Zhang et al. |
| 10,895,202 B1 | 1/2021 | Yeung et al. |
| 10,907,459 B1 | 2/2021 | Yeung et al. |
| 10,954,770 B1 | 3/2021 | Yeung et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 2004/0016245 A1 | 1/2004 | Pierson |
| 2004/0187950 A1 | 9/2004 | Cohen et al. |
| 2005/0139286 A1 | 6/2005 | Poulter |
| 2005/0226754 A1 | 10/2005 | Orr et al. |
| 2006/0061091 A1 | 3/2006 | Osterloh |
| 2006/0260331 A1 | 11/2006 | Andreychuk |
| 2007/0029090 A1 | 2/2007 | Andreychuk et al. |
| 2007/0066406 A1 | 3/2007 | Keller et al. |
| 2007/0107981 A1 | 5/2007 | Sicotte |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0098891 A1 | 5/2008 | Feher |
| 2008/0161974 A1 | 7/2008 | Alston |
| 2008/0229757 A1* | 9/2008 | Alexander ............... F02C 9/40 60/778 |
| 2008/0264625 A1 | 10/2008 | Ochoa |
| 2008/0264649 A1 | 10/2008 | Crawford |
| 2009/0064685 A1 | 3/2009 | Busekros et al. |
| 2009/0124191 A1 | 5/2009 | Van Becelaere et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0052423 A1 | 3/2011 | Gambier et al. |
| 2011/0054704 A1 | 3/2011 | Karpman et al. |
| 2011/0085924 A1 | 4/2011 | Shampine et al. |
| 2011/0101166 A1* | 5/2011 | Schwarze ............ F02D 41/021 244/135 R |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0048242 A1 | 3/2012 | Sumilla et al. |
| 2012/0199001 A1 | 8/2012 | Chillar et al. |
| 2012/0310509 A1 | 12/2012 | Pardo et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0013768 A1 | 1/2014 | Laing et al. |
| 2014/0044517 A1 | 2/2014 | Saha et al. |
| 2014/0048253 A1 | 2/2014 | Andreychuk |
| 2014/0090742 A1 | 4/2014 | Coskrey et al. |
| 2014/0130422 A1 | 5/2014 | Laing et al. |
| 2014/0147291 A1 | 5/2014 | Burnette |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0217672 A1 | 8/2015 | Shampine et al. |
| 2015/0275891 A1 | 10/2015 | Chong et al. |
| 2015/0369351 A1 | 12/2015 | Hermann et al. |
| 2016/0032703 A1* | 2/2016 | Broussard ............... E21B 43/26 166/250.01 |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0177675 A1 | 6/2016 | Morris et al. |
| 2016/0186671 A1 | 6/2016 | Austin et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0348479 A1 | 12/2016 | Oehring et al. |
| 2016/0369609 A1 | 12/2016 | Morris et al. |
| 2017/0009905 A1 | 1/2017 | Arnold |

(56) References Cited

U.S. PATENT DOCUMENTS

| | | |
|---|---|---|
| 2017/0016433 A1 | 1/2017 | Chong et al. |
| 2017/0030177 A1 | 2/2017 | Oehring et al. |
| 2017/0038137 A1 | 2/2017 | Turney |
| 2017/0074076 A1 | 3/2017 | Joseph et al. |
| 2017/0082110 A1 | 3/2017 | Lammers |
| 2017/0089189 A1 | 3/2017 | Norris et al. |
| 2017/0145918 A1 | 5/2017 | Oehring et al. |
| 2017/0218727 A1* | 8/2017 | Oehring .................. F04B 17/03 |
| 2017/0226839 A1 | 8/2017 | Broussard et al. |
| 2017/0227002 A1 | 8/2017 | Mikulski et al. |
| 2017/0234165 A1 | 8/2017 | Kersey et al. |
| 2017/0234308 A1 | 8/2017 | Buckley |
| 2017/0248034 A1 | 8/2017 | Dzieciol et al. |
| 2017/0275149 A1 | 9/2017 | Schmidt |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0334448 A1 | 11/2017 | Schwunk |
| 2017/0350471 A1 | 12/2017 | Steidl et al. |
| 2017/0370199 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0131607 A1 | 5/2019 | Gillette |
| 2019/0136677 A1 | 5/2019 | Shampine et al. |
| 2019/0153843 A1 | 5/2019 | Headrick et al. |
| 2019/0154020 A1 | 5/2019 | Glass |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277295 A1 | 9/2019 | Clyburn et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0338762 A1 | 11/2019 | Curry et al. |
| 2019/0345920 A1 | 11/2019 | Surjaatmadja et al. |
| 2019/0356199 A1 | 11/2019 | Morris et al. |
| 2020/0003205 A1 | 1/2020 | Stokkevag et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0088202 A1 | 3/2020 | Sigmar et al. |
| 2020/0095854 A1 | 3/2020 | Hinderliter |
| 2020/0132058 A1 | 4/2020 | Mollatt |
| 2020/0141219 A1 | 5/2020 | Oehring et al. |
| 2020/0141907 A1 | 5/2020 | Meck et al. |
| 2020/0166026 A1 | 5/2020 | Marica |
| 2020/0206704 A1 | 7/2020 | Chong |
| 2020/0224645 A1 | 7/2020 | Buckley |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0392826 A1 | 12/2020 | Cui et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0408071 A1 | 12/2020 | Li et al. |
| 2020/0408144 A1 | 12/2020 | Feng et al. |
| 2020/0408147 A1 | 12/2020 | Zhang et al. |
| 2021/0071574 A1 | 3/2021 | Feng et al. |
| 2021/0071579 A1 | 3/2021 | Li et al. |
| 2021/0071752 A1 | 3/2021 | Cui et al. |

FOREIGN PATENT DOCUMENTS

| | | |
|---|---|---|
| CA | 2876687 C | 4/2019 |
| CN | 2779054 | 5/2006 |
| CN | 2890325 | 4/2007 |
| CN | 200964929 Y | 10/2007 |
| CN | 101323151 A | 12/2008 |
| CN | 201190660 Y | 2/2009 |
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |

(56) References Cited

FOREIGN PATENT DOCUMENTS

| | | | |
|---|---|---|---|
| CN | 201507271 | U | 6/2010 |
| CN | 101323151 | B | 7/2010 |
| CN | 201560210 | U | 8/2010 |
| CN | 201581862 | U | 9/2010 |
| CN | 201610728 | U | 10/2010 |
| CN | 201610751 | U | 10/2010 |
| CN | 201618530 | U | 11/2010 |
| CN | 201661255 | U | 12/2010 |
| CN | 101949382 | | 1/2011 |
| CN | 201756927 | U | 3/2011 |
| CN | 101414171 | B | 5/2011 |
| CN | 102128011 | A | 7/2011 |
| CN | 102140898 | A | 8/2011 |
| CN | 102155172 | A | 8/2011 |
| CN | 202000930 | U | 10/2011 |
| CN | 202055781 | U | 11/2011 |
| CN | 202082265 | U | 12/2011 |
| CN | 202100216 | U | 1/2012 |
| CN | 202100217 | U | 1/2012 |
| CN | 202100815 | U | 1/2012 |
| CN | 202124340 | U | 1/2012 |
| CN | 202140051 | U | 2/2012 |
| CN | 202140080 | U | 2/2012 |
| CN | 202144789 | U | 2/2012 |
| CN | 202144943 | U | 2/2012 |
| CN | 202149354 | U | 2/2012 |
| CN | 102383748 | A | 3/2012 |
| CN | 202156297 | U | 3/2012 |
| CN | 202158355 | U | 3/2012 |
| CN | 202163504 | U | 3/2012 |
| CN | 202165236 | U | 3/2012 |
| CN | 202180866 | U | 4/2012 |
| CN | 202181875 | U | 4/2012 |
| CN | 202187744 | U | 4/2012 |
| CN | 202191854 | U | 4/2012 |
| CN | 202250008 | U | 5/2012 |
| CN | 101885307 | | 7/2012 |
| CN | 102562020 | A | 7/2012 |
| CN | 202326156 | U | 7/2012 |
| CN | 202370773 | U | 8/2012 |
| CN | 202417397 | U | 9/2012 |
| CN | 202417461 | U | 9/2012 |
| CN | 102729335 | A | 10/2012 |
| CN | 202463955 | U | 10/2012 |
| CN | 202463957 | U | 10/2012 |
| CN | 202467739 | U | 10/2012 |
| CN | 202467801 | U | 10/2012 |
| CN | 202531016 | U | 11/2012 |
| CN | 202544794 | U | 11/2012 |
| CN | 102825039 | A | 12/2012 |
| CN | 202578592 | U | 12/2012 |
| CN | 202579164 | U | 12/2012 |
| CN | 202594808 | U | 12/2012 |
| CN | 202594928 | U | 12/2012 |
| CN | 202596615 | U | 12/2012 |
| CN | 202596616 | U | 12/2012 |
| CN | 102849880 | A | 1/2013 |
| CN | 102889191 | A | 1/2013 |
| CN | 202641535 | U | 1/2013 |
| CN | 202645475 | U | 1/2013 |
| CN | 202666716 | U | 1/2013 |
| CN | 202669645 | U | 1/2013 |
| CN | 202669944 | U | 1/2013 |
| CN | 202671336 | U | 1/2013 |
| CN | 202673269 | U | 1/2013 |
| CN | 202751982 | U | 2/2013 |
| CN | 102963629 | A | 3/2013 |
| CN | 202767964 | U | 3/2013 |
| CN | 202789791 | U | 3/2013 |
| CN | 202789792 | U | 3/2013 |
| CN | 202810717 | U | 3/2013 |
| CN | 202827276 | U | 3/2013 |
| CN | 202833093 | U | 3/2013 |
| CN | 202833370 | U | 3/2013 |
| CN | 102140898 | B | 4/2013 |
| CN | 202895467 | U | 4/2013 |
| CN | 202935798 | U | 5/2013 |
| CN | 202935816 | U | 5/2013 |
| CN | 202970631 | U | 6/2013 |
| CN | 103223315 | A | 7/2013 |
| CN | 203050598 | U | 7/2013 |
| CN | 103233714 | A | 8/2013 |
| CN | 103233715 | A | 8/2013 |
| CN | 103245523 | A | 8/2013 |
| CN | 103247220 | A | 8/2013 |
| CN | 103253839 | A | 8/2013 |
| CN | 103277290 | A | 9/2013 |
| CN | 103321782 | A | 9/2013 |
| CN | 203170270 | U | 9/2013 |
| CN | 203172509 | U | 9/2013 |
| CN | 203175778 | U | 9/2013 |
| CN | 203175787 | U | 9/2013 |
| CN | 102849880 | B | 10/2013 |
| CN | 203241231 | U | 10/2013 |
| CN | 203244941 | U | 10/2013 |
| CN | 203244942 | U | 10/2013 |
| CN | 203303798 | U | 11/2013 |
| CN | 102155172 | B | 12/2013 |
| CN | 102729335 | B | 12/2013 |
| CN | 103420532 | A | 12/2013 |
| CN | 203321792 | U | 12/2013 |
| CN | 203412658 | | 1/2014 |
| CN | 203420697 | U | 2/2014 |
| CN | 203480755 | U | 3/2014 |
| CN | 103711437 | A | 4/2014 |
| CN | 203531815 | U | 4/2014 |
| CN | 203531871 | U | 4/2014 |
| CN | 203531883 | U | 4/2014 |
| CN | 203556164 | U | 4/2014 |
| CN | 203558809 | U | 4/2014 |
| CN | 203559861 | U | 4/2014 |
| CN | 203559893 | U | 4/2014 |
| CN | 203560189 | U | 4/2014 |
| CN | 102704870 | B | 5/2014 |
| CN | 203611843 | U | 5/2014 |
| CN | 203612531 | U | 5/2014 |
| CN | 203612843 | U | 5/2014 |
| CN | 203614062 | U | 5/2014 |
| CN | 203614388 | U | 5/2014 |
| CN | 203621045 | U | 6/2014 |
| CN | 203621046 | U | 6/2014 |
| CN | 203621051 | U | 6/2014 |
| CN | 203640993 | U | 6/2014 |
| CN | 203655221 | U | 6/2014 |
| CN | 103899280 | A | 7/2014 |
| CN | 103923670 | A | 7/2014 |
| CN | 203685052 | U | 7/2014 |
| CN | 203716936 | U | 7/2014 |
| CN | 103990410 | A | 8/2014 |
| CN | 103993869 | A | 8/2014 |
| CN | 203754009 | U | 8/2014 |
| CN | 203754025 | U | 8/2014 |
| CN | 203754341 | U | 8/2014 |
| CN | 203756614 | U | 8/2014 |
| CN | 203770264 | U | 8/2014 |
| CN | 203784519 | U | 8/2014 |
| CN | 203784520 | U | 8/2014 |
| CN | 104057864 | A | 9/2014 |
| CN | 203819819 | U | 9/2014 |
| CN | 203823431 | U | 9/2014 |
| CN | 203835337 | U | 9/2014 |
| CN | 104074500 | A | 10/2014 |
| CN | 203876633 | U | 10/2014 |
| CN | 203876636 | U | 10/2014 |
| CN | 203877364 | U | 10/2014 |
| CN | 203877365 | U | 10/2014 |
| CN | 203877375 | U | 10/2014 |
| CN | 203877424 | U | 10/2014 |
| CN | 203879476 | U | 10/2014 |
| CN | 203879479 | U | 10/2014 |
| CN | 203890292 | U | 10/2014 |
| CN | 203899476 | U | 10/2014 |
| CN | 203906206 | U | 10/2014 |
| CN | 104150728 | A | 11/2014 |

(56) References Cited

FOREIGN PATENT DOCUMENTS

| | | | |
|---|---|---|---|
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |
| CN | 104533392 A | 4/2015 |
| CN | 104563938 A | 4/2015 |
| CN | 104563994 A | 4/2015 |
| CN | 104563995 A | 4/2015 |
| CN | 104563998 A | 4/2015 |
| CN | 104564033 A | 4/2015 |
| CN | 204257122 U | 4/2015 |
| CN | 204283610 U | 4/2015 |
| CN | 204283782 U | 4/2015 |
| CN | 204297682 U | 4/2015 |
| CN | 204299810 U | 4/2015 |
| CN | 103223315 B | 5/2015 |
| CN | 104594857 A | 5/2015 |
| CN | 104595493 A | 5/2015 |
| CN | 104612647 A | 5/2015 |
| CN | 104612928 A | 5/2015 |
| CN | 104632126 A | 5/2015 |
| CN | 204325094 U | 5/2015 |
| CN | 204325098 U | 5/2015 |
| CN | 204326983 U | 5/2015 |
| CN | 204326985 U | 5/2015 |
| CN | 204344040 U | 5/2015 |
| CN | 204344095 U | 5/2015 |
| CN | 104727797 A | 6/2015 |
| CN | 204402414 U | 6/2015 |
| CN | 204402423 U | 6/2015 |
| CN | 204402450 U | 6/2015 |
| CN | 103247220 B | 7/2015 |
| CN | 104803568 A | 7/2015 |
| CN | 204436360 U | 7/2015 |
| CN | 204457524 U | 7/2015 |
| CN | 204472485 U | 7/2015 |
| CN | 204473625 U | 7/2015 |
| CN | 204477303 U | 7/2015 |
| CN | 204493095 U | 7/2015 |
| CN | 204493309 U | 7/2015 |
| CN | 103253839 B | 8/2015 |
| CN | 104820372 A | 8/2015 |
| CN | 104832093 A | 8/2015 |
| CN | 104863523 A | 8/2015 |
| CN | 204552723 U | 8/2015 |
| CN | 204553866 U | 8/2015 |
| CN | 204571831 U | 8/2015 |
| CN | 204703814 U | 10/2015 |
| CN | 204703833 U | 10/2015 |
| CN | 204703834 U | 10/2015 |
| CN | 105092401 A | 11/2015 |
| CN | 103233715 B | 12/2015 |
| CN | 103790927 | 12/2015 |
| CN | 105207097 | 12/2015 |
| CN | 204831952 U | 12/2015 |
| CN | 204899777 U | 12/2015 |
| CN | 102602323 | 1/2016 |
| CN | 105240064 A | 1/2016 |
| CN | 204944834 | 1/2016 |
| CN | 205042127 U | 2/2016 |
| CN | 205172478 U | 4/2016 |
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |

(56) References Cited

FOREIGN PATENT DOCUMENTS

| | | |
|---|---|---|
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |
| CN | 108254276 A | 7/2018 |
| CN | 108311535 A | 7/2018 |
| CN | 207583576 | 7/2018 |
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108868675 A | 11/2018 |
| CN | 208086829 | 11/2018 |
| CN | 208089263 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 A | 5/2020 |

(56) References Cited

FOREIGN PATENT DOCUMENTS

| | | |
|---|---|---|
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4241614 | 6/1994 |
| DE | 102012018825 | 3/2014 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3354866 | 8/2018 |
| GB | 1438172 | 6/1976 |
| JP | S57135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 2012139380 | 10/2012 |
| WO | 2013185399 | 12/2013 |
| WO | 2015158020 | 10/2015 |
| WO | 2016033983 | 3/2016 |
| WO | 2016078181 | 5/2016 |
| WO | 2016101374 | 6/2016 |
| WO | 2016112590 | 7/2016 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019060922 | 3/2019 |
| WO | 2019126742 | 6/2019 |
| WO | 2019147601 | 8/2019 |
| WO | 2019169366 | 9/2019 |
| WO | 2019200510 | 10/2019 |
| WO | 2019210417 | 11/2019 |
| WO | 2020018068 | 1/2020 |
| WO | 2020072076 | 4/2020 |
| WO | 2020104088 | 5/2020 |
| WO | 2020131085 A1 | 6/2020 |
| WO | 2020211083 | 10/2020 |
| WO | 2020211086 | 10/2020 |

OTHER PUBLICATIONS

Filipović, Ivan, Preliminary Selection of Basic Parameters of Different Torsional Vibration Dampers Intended for use in Medium-Speed Diesel Engines, Transactions of Famena XXXVI-3 (2012).

Marine Turbine Technologies, 1 MW Power Generation Package, http://marineturbine.com/power-generation, 2017.

Business Week: Fiber-optic cables help fracking, cablinginstall.com. Jul. 12, 2013. https://www.cablinginstall.com/cable/article/16474208/businessweek-fiberoptic-cables-help-fracking.

Fracking companies switch to electric motors to power pumps, iadd-intl.org. Jun. 27, 2019. https://www.iadd-intl.org/articles/fracking-companies-switch-to-electric-motors-to-power-pumps/.

The Leader in Frac Fueling, suncoastresources.com. Jun. 29, 2015. https://web.archive.org/web/20150629220609/https://www.suncoastresources.com/oilfield/fueling-services/.

Mobile Fuel Delivery, atlasoil.com. Mar. 6, 2019. https://www.atlasoil.com/nationwide-fueling/onsite-and-mobile-fueling.

Frac Tank Hose (FRAC), 4starhose.com. Accessed: Nov. 10, 2019. http://www.4starhose.com/product/frac_tank_hose_frac.aspx.

PLOS ONE, Dynamic Behavior of Reciprocating Plunger Pump Discharge Valve Based on Fluid Structure Interaction and Experimental Analysis. Oct. 21, 2015.

FMC Technologies, Operation and Maintenance Manual, L06 Through L16 Triplex Pumps Doc No. OMM50000903 Rev: E p. 1 of 66. Aug. 27, 2009.

Gardner Denver Hydraulic Fracturing Pumps GD 3000 https://www.gardnerdenver.com/en-us/pumps/triplex-fracking-pump-gd-3000.

Lekontsev, Yu M., et al. "Two-side sealer operation." Journal of Mining Science 49.5 (2013): 757-762.

Tom Hausfeld, GE Power & Water, and Eldon Schelske, Evolution Well Services, TM2500+ Power for Hydraulic Fracturing.

FTS International's Dual Fuel Hydraulic Fracturing Equipment Increases Operational Efficiencies, Provides Cost Benefits, Jan. 3, 2018.

CNG Delivery, Fracturing with natural gas, dual-fuel drilling with CNG, Aug. 22, 2019.

PbNG, Natural Gas Fuel for Drilling and Hydraulic Fracturing, Diesel Displacement / Dual Fuel & Bi-Fuel, May 2014.

Integrated Flow, Skid-mounted Modular Process Systems, https://ifsolutions.com/.

(56) References Cited

OTHER PUBLICATIONS

Cameron, A Schlumberger Company, Frac Manifold Systems, 2016.

ZSi-Foster, Energy | Solar | Fracking | Oil and Gas, https://www.zsi-foster.com/energy-solar-fracking-oil-and-gas.html.

JBG Enterprises, Inc., WS-Series Blowout Prevention Safety Coupling—Quick Release Couplings, http://www.jgbhose.com/products/WS-Series-Blowout-Prevention-Safety-Coupling.asp.

Halliburton, Vessel-based Modular Solution (VMS), 2015.

Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.

Wolf, Jürgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.

Ginter, Timothy, and Thomas Bouvay. "Uprate options for the MS7001 heavy duty gas turbine." GE paper GER-3808C, GE Energy 12 (2006).

Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.

Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.

II-VI Marlow Industries, Thermoelectric Technologies in Oil, Gas, and Mining Industries, blog.marlow.com (Jul. 24, 2019).

B.M. Mahlalela, et al., .Electric Power Generation Potential Based on Waste Heat and Geothermal Resources in South Africa, pangea.stanford.edu (Feb. 11, 2019).

Department of Energy, United States of America, The Water-Energy Nexus: Challenges and Opportunities purenergypolicy.org (Jun. 2014).

Ankit Tiwari, Design of a Cooling System for a Hydraulic Fracturing Equipment, The Pennsylvania State University, The Graduate School, College of Engineering, 2015.

Jp Yadav et al., Power Enhancement of Gas Turbine Plant by Intake Air Fog Cooling, Jun. 2015.

Mee Industries: Inlet Air Fogging Systems for Oil, Gas and Petrochemical Processing, Verdict Media Limited Copyright 2020.

M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.

Advances in Popular Torque-Link Solution Offer OEMs Greater Benefit, Jun. 21, 2018.

Emmanuel Akita et al., Mewbourne College of Earth & Energy, Society of Petroleum Engineers; Drilling Systems Automation Technical Section (DSATS); 2019.

PowerShelter Kit II, nooutage.com, Sep. 6, 2019.

EMPengineering.com, HEMP Resistant Electrical Generators / Hardened Structures HEMP/GMD Shielded Generators, Virginia.

Blago Minovski, Coupled Simulations of Cooling and Engine Systems for Unsteady Analysis of the Benefits of Thermal Engine Encapsulation, Department of Applied Mechanics, Chalmers University of Technology Goteborg, Sweden 2015.

J. Porteiro et al., Feasibility of a new domestic CHP trigeneration with heat pump: II. Availability analysis. Design and development, Applied Thermal Engineering 24 (2004) 1421-1429.

Europump and Hydrualic Institute, Variable Speed Pumping: A Guide to Successful Applications, Elsevier Ltd, 2004.

Capstone Turbine Corporation, Capstone Receives Three Megawatt Order from Large Independent Oil & Gas Company in Eagle Ford Shale Play, Dec. 7, 2010.

Wikipedia, Westinghouse Combustion Turbine Systems Division, https://en.wikipedia.org/wiki/Westinghouse_Combustion_Turbine_Systems_Division, circa 1960.

Wikipedia,Union Pacific GTELs, https://en.wikipedia.org/wiki/Union_Pacific_GTELs, circa 1950.

HCI JET Frac, Screenshots from YouTube, Dec. 11, 2010. https://www.youtube.com/watch?v=6HjXkdbFaFQ.

AFD Petroleum Ltd., Automated Hot Zone, Frac Refueling System, Dec. 2018.

Eygun, Christiane, et al., URTeC: 2687987, Mitigating Shale Gas Developments Carbon Footprint: Evaluating and Implementing Solutions in Argentina, Copyright 2017, Unconventional Resources Technology Conference.

Walzel, Brian, Hart Energy, Oil, Gas Industry Discovers Innovative Solutions to Environmental Concerns, Dec. 10, 2018.

Frac Shack, Bi-Fuel FracFueller brochure, 2011.

Pettigrew, Dana, et al., High Pressure Multi-Stage Centrifugal Pump for 10,000 psi Frac Pump—HPHPS FRAC Pump, Copyright 2013, Society of Petroleum Engineers, SPE 166191.

Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.

Wallace, E.M., Associated Shale Gas: From Flares to Rig Power, Copyright 2015, Society of Petroleum Engineers, SPE-173491-MS.

Williams, C.W. (Gulf Oil Corp. Odessa Texas), The Use of Gas-turbine Engines in an Automated High-Pressure Water-injection Stations; American Petroleum Institute; API-63-144 (Jan. 1, 1963).

Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).

Porter, John A. (SOLAR Division International Harvester Co.), Modern Industrial Gas Turbines for the Oil Field; American Petroleum Institute; Drilling and Production Practice; API-67-243 (Jan. 1, 1967).

Cooper et al., Jet Frac Porta-Skid—A New Concept in Oil Field Service Pump Equipments[sic]; Halliburton Services; SPE-2706 (1969).

Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).

Kas'yanov et al., Application of gas-turbine engines in pumping units complexes of hydraulic fracturing of oil and gas reservoirs; Exposition Oil & Gas; (Oct. 2012) (published in Russian).

AFGlobal Corporation, Durastim Hydraulic Fracturing Pump, A Revolutionary Design for Continuous Duty Hydraulic Fracturing, 2018.

\* cited by examiner

METHODS AND SYSTEMS FOR SUPPLYING FUEL TO GAS TURBINE ENGINES

CROSS REFERENCE TO RELATED APPLICATION

This application claims priority to and the benefit of U.S. Provisional Application No. 62/899,966, filed Sep. 13, 2019, titled "METHODS AND SYSTEMS FOR AUTONOMOUS CONTROL OF A DUAL FUEL MANAGEMENT SYSTEM", and U.S. Provisional Application No. 62/704,395, filed May 8, 2020, titled "METHODS AND SYSTEMS FOR SUPPLYING FUEL TO GAS TURBINE ENGINES", the entire disclosures of both of which are incorporated herein by reference.

TECHNICAL FIELD

The present disclosure relates to methods and systems for supplying fuel to gas turbine engines, and more particularly, to methods and systems for controlling and/or managing the supply of a primary fuel from a primary fuel source and a secondary fuel from a secondary fuel supply to a plurality of gas turbine engines associated with a hydraulic fracturing system.

BACKGROUND

Fracturing is an oilfield operation that stimulates production of hydrocarbons, such that the hydrocarbons may more easily or readily flow from a subsurface formation to a well. For example, a fracturing system may be configured to fracture a formation by pumping a fracking fluid into a well at high pressure and high flow rates. Some fracking fluids may take the form of a slurry including water, proppants, and/or other additives, such as thickening agents and/or gels. The slurry may be forced via one or more pumps into the formation at rates faster than can be accepted by the existing pores, fractures, faults, or other spaces within the formation. As a result, pressure builds rapidly to the point where the formation fails and begins to fracture. By continuing to pump the fracking fluid into the formation, existing fractures in the formation are caused to expand and extend in directions farther away from a well bore, thereby creating flow paths to the well bore. The proppants may serve to prevent the expanded fractures from closing when pumping of the fracking fluid is ceased or may reduce the extent to which the expanded fractures contract when pumping of the fracking fluid is ceased. Once the formation is fractured, large quantities of the injected fracking fluid are allowed to flow out of the well, and the production stream of hydrocarbons may be obtained from the formation.

Prime movers may be used to supply power to a plurality of pumps for pumping the fracking fluid into the formation. For example, a plurality of gas turbine engines may each be mechanically connected to a corresponding pump and operated to drive the pump. Some gas turbine engines may be designed to be operated using more than a single type of fuel, which may provide efficiency and flexibility of use advantages as compared to traditional fracturing pump fleets including engines that are designed to be operated using a single type of fuel. Gas turbine engines designed to be operated using more than a single type of fuel may also provide improved reliability, lower emissions, and/or smaller foot print as compared to traditional fracturing pump fleets. In such traditional fleets, when an engine-pump unit runs low on fuel, such as diesel fuel, that unit must be idled while refueling or while another stand-by unit is fueled and brought on-line.

For example, once low on fuel a traditional unit must be shut-off and refueled while another unit is introduced into its place to make up for the loss of the pumping power that the unit low on fuel provides. This can affect the pumping performance during a fracturing operation sequence, as well as requiring human intervention to perform the refueling, aligning suction and discharge valves, etc. This can require multiple personnel to communicate information, for example, so the relatively complex process is performed correctly. Using a single fuel source may also limit the ability for the fracturing fleet to complete a fracturing operation sequence in an uninterrupted manner when low on fuel, which results in delays in pumping completion.

During a fracturing operation, the level of fuel available in each fuel tank associated with a corresponding engine may need to be evaluated between fracking stages to determine whether more fuel is required to ensure that the units can be operated throughout the next stage or multiple stages of the fracturing operation sequence. This may result in operators needing to manually check fuel tanks and/or gauge levels, which can be time consuming and expose operators to hazardous liquids and vapors.

Accordingly, it can be seen that a need exists for more efficient ways for control and operation of fracturing pump systems. The present disclosure may address one or more of the above-referenced drawbacks, as well as other possible drawbacks.

SUMMARY

According to a first embodiment, the present disclosure is generally directed to methods and systems for control of fuel supplied to a gas turbine engine-driven fracturing pump system used in hydraulic fracturing. In some examples, a method of controlling fuel supply to a plurality of gas turbine engines connected to pumps associated with a hydraulic fracturing system may be provided. In some examples, the method may include receiving a signal indicating that supply pressure of primary fuel supplied to one or more gas turbine engines of the plurality of gas turbine engines falls below a set point. The method may further include initiating a timer and increasing a data sampling rate associated with the plurality gas turbine engines based at least in part on the signal. In some examples, the method may further include, when the supply pressure of primary fuel to the one or more gas turbine engines remains below the set point when the timer reaches a predetermined end time, identifying a gas turbine engine of the plurality of gas turbine engines having a greatest amount of a secondary fuel available. The method may further include causing supply of the secondary fuel to the identified gas turbine engine in place of at least some of the primary fuel supplied to the identified gas turbine engine.

According to a further embodiment, this disclosure is also generally directed to a system for controlling fuel supply to a plurality of gas turbine engines connected to pumps associated with a hydraulic fracturing system. The system may include one or more hydraulic fracturing units including one or more of the plurality of gas turbine engines and a pump connected thereto. The system may further include a controller in communication with the one or more hydraulic fracturing units. The controller may include memory including instructions executable by a computer for performing operations that may include: receiving a signal indicating that supply pressure of primary fuel to one or more gas turbine engines of the plurality of gas turbine engines falls below a set point, and based at least in part on the signal, initiating a timer and increasing a data sampling rate associated with the plurality of gas turbine engines. The operations may further include, when the supply pressure of primary fuel to the one or more gas turbine engines remains below the set point when the timer reaches a predetermined end time, identifying a gas turbine engine of the plurality of gas turbine engines having a greatest amount of a secondary fuel available. The operations may further include causing supply of the secondary fuel to the identified gas turbine engine in place of at least some of the primary fuel supplied to the gas turbine engine.

According to yet another embodiment, this disclosure is generally directed to a system for supplying fuel to a plurality of gas turbine engines. The system may include a primary sensor associated with the plurality of gas turbine engines. The primary sensor may be configured to generate a primary signal indicative of an ability of a primary fuel source to supply an amount of primary fuel sufficient to operate the plurality of gas turbine engines at a first output. The system may also include a plurality of secondary sensors. Each of the plurality of secondary sensors may be associated with one of the plurality of gas turbine engines and may be configured to generate a secondary signal indicative of an amount of secondary fuel available from a secondary fuel supply associated with each of the plurality of gas turbine engines. The system may further include a controller in communication with the primary sensor, each of the plurality of secondary sensors, and a plurality of primary valves. Each of the plurality of primary valves may be configured to control flow communication between the primary fuel source and one of the plurality of gas turbine engines. The controller may be configured to determine, based at least in part on the primary signal, that the primary fuel source is supplying an insufficient amount of the primary fuel to operate one or more of the plurality of gas turbine engines at the first output. The controller may be further configured to determine, based at least in part on the secondary signals, that the amount of secondary fuel available from a first secondary fuel supply associated with a first of the plurality of gas turbine engines is greater than an amount of secondary fuel available from each of a remainder of the secondary fuel supplies associated with a remainder of the plurality of gas turbine engines. The controller may also be configured to cause a primary valve of the plurality of primary valves to inhibit flow communication between the primary fuel source and the first of the plurality of gas turbine engines and cause supply of secondary fuel from the first secondary fuel supply to the first of the plurality of gas turbine engines.

According to still a further embodiment, this disclosure is generally directed to a system for supplying fuel to a plurality of gas turbine engines. The system may include a primary sensor associated with the plurality of gas turbine engines. The primary sensor may be configured to generate a primary signal indicative of an ability of a primary fuel source to supply an amount of primary fuel sufficient to operate the plurality of gas turbine engines at a first output. The system may also include a controller in communication with the primary sensor and a plurality of primary valves, each of the plurality of primary valves configured to control flow communication between the primary fuel source and one of the plurality of gas turbine engines. The controller may be configured to determine, based at least in part on the primary signal, that the primary fuel source does not have an ability to supply an amount of primary fuel sufficient to operate the plurality of gas turbine engines at the first output. The controller may be further configured to cause one or more primary valves configured to control flow communication between the primary fuel source and the plurality of gas turbine engines to inhibit flow communication between the primary fuel source and the plurality of gas turbine engines. The controller may also be configured to cause supply of secondary fuel from a plurality of secondary fuel supplies to each of the plurality of gas turbine engines, wherein each of the plurality of secondary fuel supplies is associated with one of the plurality of gas turbine engines. The controller may be further configured to cause operation of the plurality of gas turbine engines at the first output using the secondary fuel.

Still other aspects, embodiments, and advantages of these exemplary embodiments and embodiments, are discussed in detail below. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

DETAILED DESCRIPTION

Figure 1:
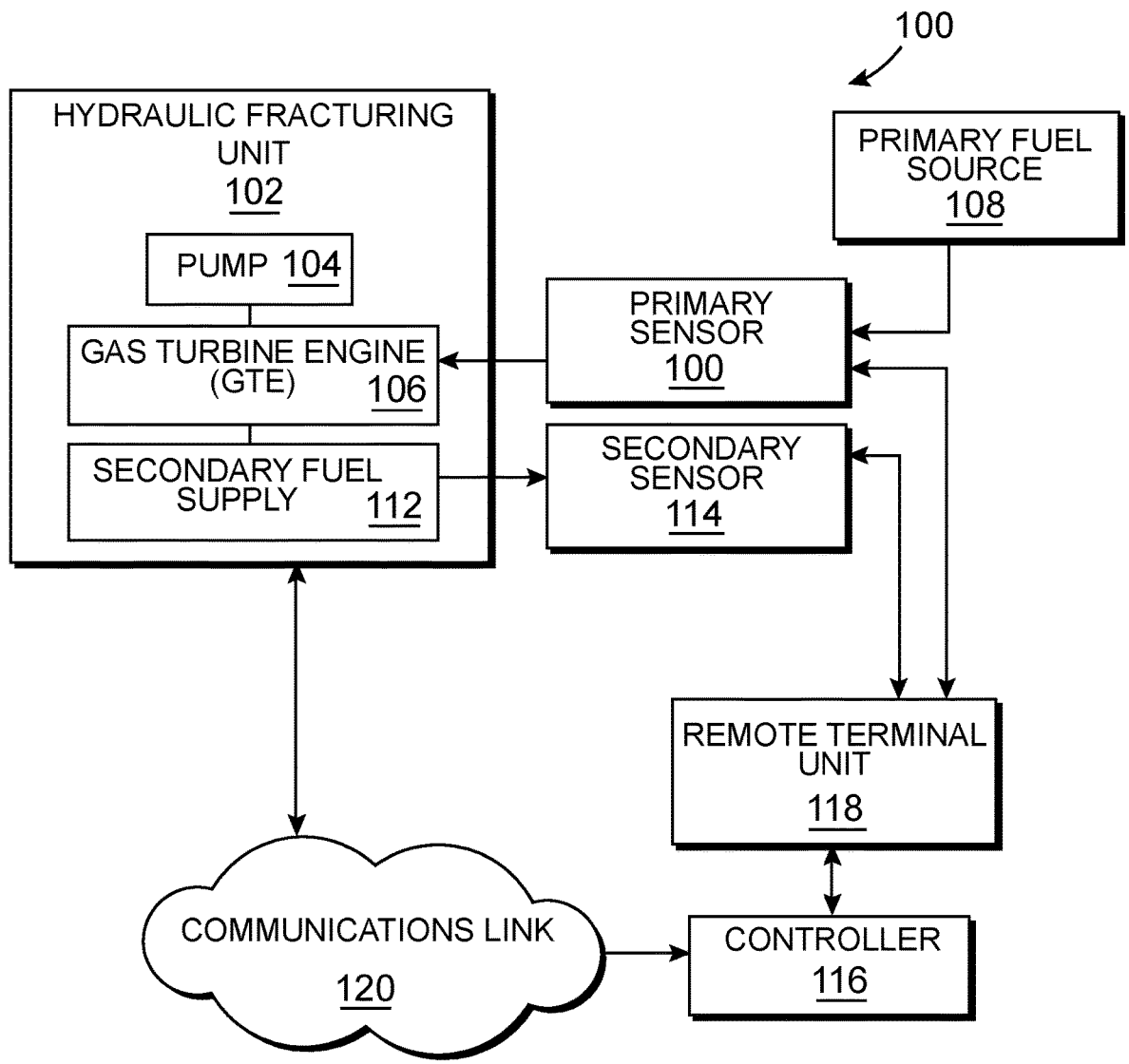
FIG. 1 illustrates an example system for supplying fuel to an example hydraulic fracturing system according to embodiments of the disclosure.

Referring now to the drawings in which like numerals indicate like parts throughout the several views, the following description is provided as an enabling teaching of exemplary embodiments, and those skilled in the relevant art will recognize that many changes can be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and can even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

FIG. 1 illustrates a schematic diagram of an example system 100 for controlling supply of fuel to an example hydraulic fracturing unit 102 including a pump 104 configured to supply a fracking fluid to a subterranean formation, and a gas turbine engine (GTE) 106 connected to the pump 104 and configured to drive the pump 104 according to embodiments of the disclosure. As shown in more detail with respect to FIGS. 2-4. The system 100 may be part of a hydraulic fracturing system that includes a plurality (or fleet) of hydraulic fracturing units configured to pump a fracking fluid into a well at high pressure and high flow rates, so that a subterranean formation fails and begins to fracture in order to promote hydrocarbon production from the well.

In some examples, the system 100 may be semi-autonomously controlled or fully-autonomously controlled. In some examples, one or more of the hydraulic fracturing units 102 may include directly driven turbine (DDT) pumping units, in which the pumps 104 are connected to one or more GTEs 106 that supply power to the respective pump 104 for supplying fracking fluid at high pressure and high flow rates to a formation. For example, a GTE 106 may be connected to a respective pump 104 via a reduction gearbox connected to a drive shaft, which, in turn, is connected to an input shaft or input flange of a respective reciprocating pump 104. Other types of GTE-to-pump arrangements are contemplated. In some examples, one or more of the GTEs 106 may be a dual-fuel or bi-fuel GTE, for example, capable of being operated using of two or more different types of fuel, such as natural gas and diesel fuel, although other types of fuel are contemplated. For example, a dual-fuel or bi-fuel GTE may be capable of being operated using a first type of fuel (e.g., a primary fuel), using a second type of fuel (e.g., a secondary fuel), and/or using a combination of a first type of fuel and a second type of fuel. The one or more GTEs 106 may be operated to provide horsepower to drive one or more of the pumps 104 to safely and successfully fracture a formation during a well stimulation project.

As shown in FIG. 1, the system 100 may include a primary fuel source 108 for suppling primary fuel to one or more of the GTEs 106 and, in some instances, a primary sensor 110 configured to generate one or more signals indicative of an ability of the primary fuel source 108 to supply an amount of primary fuel sufficient to operate the GTE 106 at a desired output. In some examples, for example, as shown in FIG. 1, one or more of the hydraulic fracturing units 102 may include a secondary fuel supply 112 configured to supply a secondary fuel to one or more of the GTEs 106, for example, if the primary fuel source 108 is not supplying a sufficient amount of fuel to the GTE 106 to operate the GTE 106 at the desired output. In some examples, the hydraulic fracturing unit 102 may include a dedicated secondary fuel supply 112 for supplying secondary fuel to the GTE 106 of the respective hydraulic fracturing unit 102, for example, as shown in FIG. 1. The system 100 may also include a secondary sensor 114 associated with the secondary fuel supply 112 and configured to generate one or more signals indicative of an amount of secondary fuel available from the secondary fuel supply 112 associated with one or more of the plurality of GTEs 106 associated with a hydraulic fracturing system, for example, a respective GTE 106 associated with the respective secondary fuel supply 112, as shown in FIG. 1. In some examples, one or more of the hydraulic fracturing units 102 may include a plurality of the pump 104 and GTE 106 pairs. Although other types of fuel are contemplated, in some examples, the primary fuel may include gaseous fuels, such as, for example, compressed natural gas (CNG), natural gas, field gas, pipeline gas, etc., and the secondary fuel may include liquid fuels, such as, for example, diesel fuel (e.g., #2 Diesel), bio-diesel fuel, bio-fuel, alcohol, gasoline, gasohol, aviation fuel, etc.

The system 100 may also include one or more controllers 116 configured to control one or more embodiments related to the supply of fuel to one or more of the GTEs 106 associated with one or more respective hydraulic fracturing units 102, for example, as outlined herein. In some examples, the system 100 may also include a remote terminal unit 118 in communication with one or more of the primary sensor 110 or the secondary sensor 114 and configured to provide a communication interface between the primary sensor 110, the secondary sensor 114, and the controller 116. In some examples, the controller 116 may be configured to interface with one or more of the remote terminal units 118 associated with one or more of the hydraulic fracturing units 102. The remote terminal units 118 may include communication and/or processing interfaces, and may be configured to receive, store, and/or process sensor data associated with sensor signals received from one or more of the primary sensors 110 and/or one more of the secondary sensors 114, as well as other sensors that may be associated with the system 100. The one or more remote terminal units 118 may be configured to communicate such sensor data to the controller 116. In some examples, the controller 116 may serve as a supervisory control for one or more of the remote terminal units 118, one or more of which may be in communication with an individual hydraulic fracturing unit 102 or multiple hydraulic fracturing units 102. The controller 116 and/or the remote terminal units 118, in some examples, may include one or more industrial control systems (ICS), such as, for example, supervisory control and data acquisition (SCADA) systems, distributed control systems (DCS), and/or programmable logic controllers (PLCs).

As shown in FIG. 1, the GTE 106 is in communication with the primary sensor 110. In some examples, the primary sensor 110 may be configured to generate one or more signals indicative of the fuel pressure of the primary fuel (e.g., a gaseous fuel) supplied from the primary fuel source 108 to the GTE 106, for example, the fuel pressure upstream of the GTE 106. This may be an indication of the ability of the primary fuel source 108 to supply an amount of primary fuel sufficient to operate one or more of the plurality of GTEs 106 at a desired power and/or torque output. This may be an indication of the amount of primary fuel available from the primary fuel source 108 for operating the GTE 106 at the desired output. The primary sensor 110 may include one or more pressure sensors and/or one or more flow meters. Other sensor types are contemplated. For example, when the primary sensor 110 provides an indication of low pressure, the GTE 106 may not be able to operate at the desired output. In some examples, under such circumstances, the GTE 106 may be operated using the secondary fuel supplied by the secondary fuel supply 112. The secondary fuel supply 112 may be provided in a fuel tank or reservoir connected to the respective or associated GTE 106. In some examples, when the primary fuel source 108 is not providing a sufficient amount of the primary fuel to operate the respective GTE 106 at the desired output (e.g., the fuel pressure is insufficient), at least some or all of the primary fuel supplied to the GTE 106 may be supplemented and/or replaced with secondary fuel supplied by the secondary fuel supply 112 associated with the respective GTE 106, for example, as outlined herein.

The secondary sensor 114 may include one or more sensors configured to generate one or more signals indicating the amount (e.g., the volume) of secondary fuel contained in the secondary fuel supply 112 of the associated hydraulic fracturing unit 102. For example, the secondary sensor 112 may be configured to generate one or more signals indicative of a level or volume of secondary fuel (e.g., diesel fuel) available for supply to the GTE 106 in the secondary fuel supply 112 associated with the hydraulic fracturing unit 102. In some examples, the secondary sensor 114 may include one or more sensors, such as, for example, a RADAR level sensor, a guided-wave RADAR level sensor, an ultrasonic level sensor, a capacitive level sensor, a hydrostatic level sensor, a probe-type level sensor, a float-type level sensor, a radio frequency admittance level sensor, an electro-optical level sensor, and/or any other type of sensor configured to generate signals providing an indication of the amount of secondary fuel available in the respective secondary fuel supply 112.

As shown in FIG. 1, the controller 116 may, in some examples, be in communication with the hydraulic fracturing unit 102 (e.g., the GTE 106 and/or any related components) via a communications link 120 configured to receive operational data from the hydraulic fracturing unit 102. In some examples, communications may be performed according to communication protocols, such as, for example, Profibus, Modbus, and CANopen. The communications link 120 may be any of one or more communication networks, such as, for example, an Ethernet interface, a universal serial bus (USB) interface, and/or a wireless interface. In some examples, the controller 116 may be in communication with the hydraulic fracturing unit 102 via hard-wired link or cable, such as, for example, a communications interface cable.

The controller 116 may include a computer system having one or more processors configured to execute computer-executable instructions to receive and/or analyze data from various data sources, such as the hydraulic fracturing unit 102, one or more primary sensors 110 and/or one or more secondary sensors 114, and may include one or more remote terminal units 118. The controller 116 may be further configured to provide inputs, gather transfer function outputs, and/or transmit instructions from any number of operators and/or personnel. In some examples, the controller 116 may be configured to perform control actions, as well as provide inputs to the one or more remote terminal units 118. In some examples, the controller 116 may be configured to control, based at least in part on data received from one or more data sources (e.g., the hydraulic fracturing units 102, the primary sensors 110, and/or the secondary sensors 112), one or more of various actions to be performed by various controllable components of the hydraulic fracturing unit 102 and related components. In some examples, the controller 116 may be an independent entity or component communicatively coupled to one or more remote terminal units 118.

Figure 2:
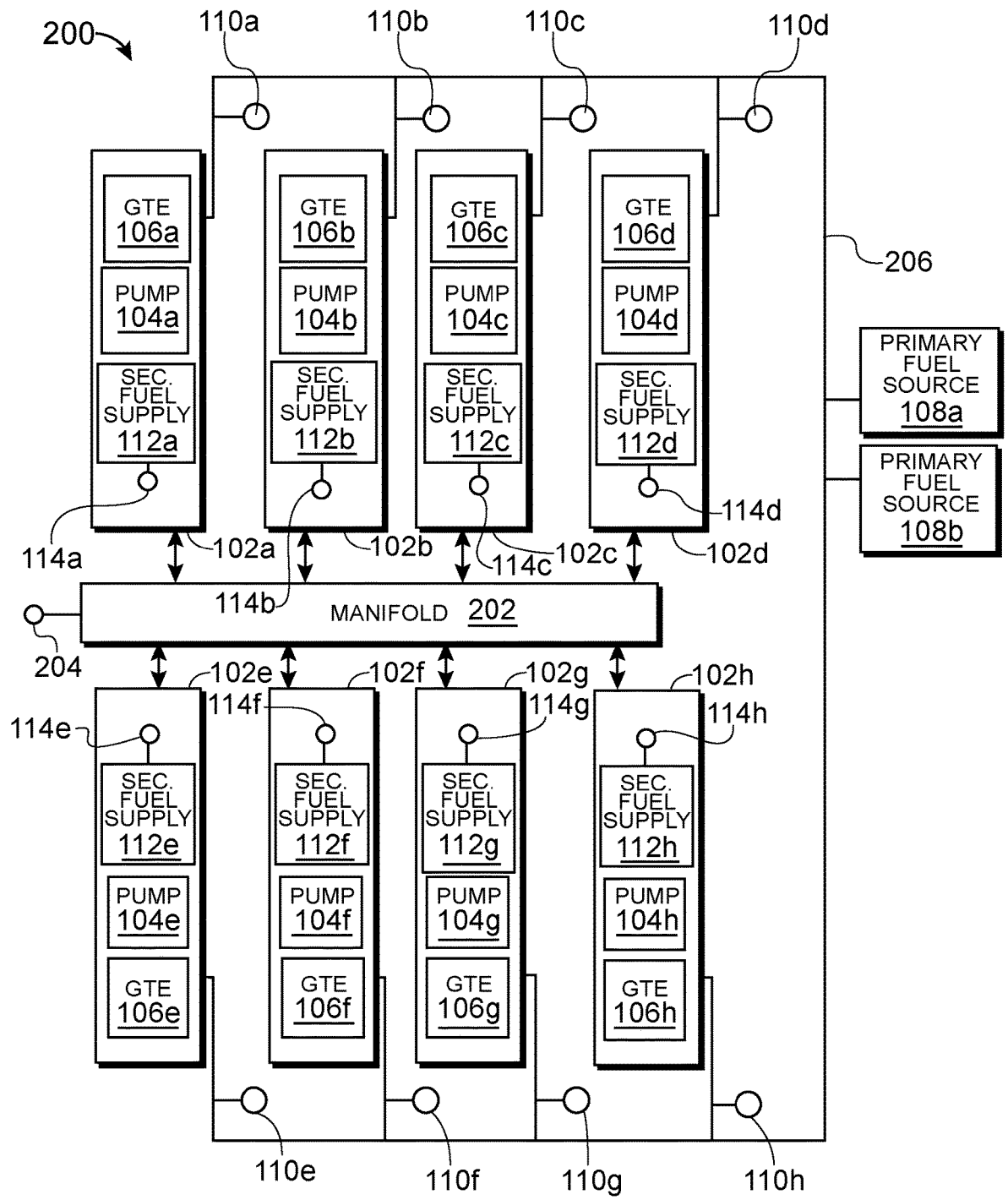
FIG. 2 is a schematic diagram of an example fuel distribution system according to embodiments of the disclosure.

FIG. 2 is a schematic diagram of an example fuel distribution system 200 associated with a plurality, or fleet, of example hydraulic fracturing units 102 according to embodiments of the disclosure, identified as 102a, 102b, 102c, 102d, 102e, 102f, 102g, and 102h, although fewer or more hydraulic fracturing units are contemplated. In the example shown, each of the plurality hydraulic fracturing units 102 includes a GTE 106, identified respectively as 106a, 106b, 106c, 106d, 106e, 106f, 106g, and 106h. Each of the GTEs 106 supplies power for each of the hydraulic fracturing units 102 to operate a pump 104, identified respectively as 104a, 104b, 104c, 104d, 104e, 104f, 104g, and 104h. The example shown in FIG. 2 includes a manifold 202 configured to integrate the fluid outputs (e.g., the fracking fluid outputs) of one or more of the hydraulic fracturing units 102 to provide flow communication with the wellhead 204, which provides flow communication with the subterranean formation being conditioned by the fracturing process.

The example fuel distribution system 200 shown in FIG. 2 is a hybrid hub-type fuel distribution system, including a first primary fuel source 108a and a second primary fuel source 108b. The example first and second primary fuel sources 108a and 108b are shared across the plurality of GTEs 106 in the plurality of hydraulic fracturing units 102. In the example shown, a primary sensor 110 is associated with each of the respective GTEs 106, and the primary sensors are respectively identified as 110a, 110b, 110c, 110d, 110e, 110f, 110g, and 110h. In some examples, each of primary sensors 110 may be configured to generate one or more signals indicative of an ability of the primary fuel source 108a and/or 108b to supply a sufficient amount of a primary fuel (e.g., a gaseous fuel) to operate one or more of the respective GTEs 106 at a desired output (e.g., the desired output for each of the GTEs 106 and/or the desired output total for all of the operational GTEs 106). For example, the primary sensors 110 may include one or pressure sensors and/or one or more flow rate sensors.

In some examples, the hybrid hub-type arrangement shown in FIG. 2 may provide flexibility of operation, for example, if one of the primary fuel sources 108a or 108b fails to supply a sufficient amount of primary fuel to operate all the GTEs 106 at a desired output. The other primary fuel source may be able to partially or completely overcome any deficit of the amount of primary fuel supplied by the underperforming primary fuel source. However, such a hybrid hub-type arrangement may require more set-up time, additional connections, and capital cost, for example, due to additional piping and/or valves sometimes characteristic of such arrangements.

As shown in the example of FIG. 2, each hydraulic fracturing unit 102 includes a secondary sensor 114, identified respectively as 114a, 114b, 114c, 114d, 114e, 114f, 114g, and 114h. The secondary sensors 114 may be configured to generate one or more signals indicative of the amount of secondary fuel available from the respective secondary fuel supplies 112 associated with each of the plurality of GTEs 106. As discussed herein, signals generated by the secondary sensors 114 may be received by the controller 116 (see FIG. 1).

Figure 3:
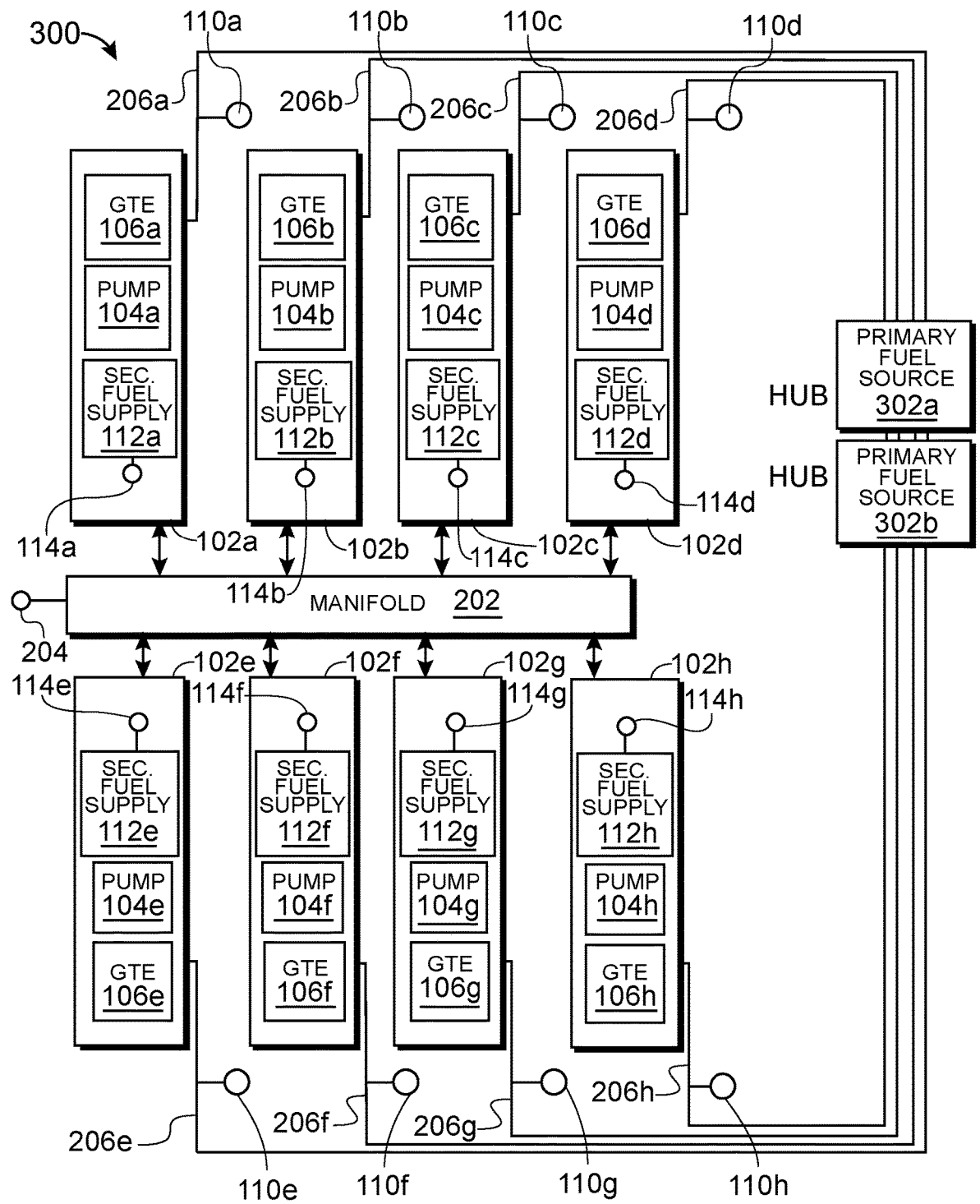
FIG. 3 is a schematic diagram of another example fuel distribution system according to embodiments of the disclosure.

FIG. 3 is a schematic diagram of another example fuel distribution system 300 according to embodiments of the disclosure. The example fuel distribution system 300 shown in FIG. 3, may be provided in association with a plurality or fleet of hydraulic fracturing units 102, for example, at least similar to the plurality of hydraulic fracturing units 102 shown in FIG. 2. The example fuel distribution system 300 is a multiple hub and spoke-type system, which may include a dedicated first primary fuel source hub 302a and/or a second primary fuel source hub 302b that provides primary fuel to each set of hydraulic fracturing units 102a-102h. As indicated, dedicated supply lines identified respectively as 206a, 206b, 206c, 206d, 206e, 206f, 206g, and 206h, provide primary fuel to each respective hydraulic fracturing unit 102a-102h. This example arrangement may provide relatively reduced flexibility in terms of sharing primary fuel across the first and second primary fuel source hubs 302a and 302b, but may provide substantially uniform piping pressure drops to all the hydraulic fracturing units 102a-102h and may be desired in certain situations based on layout and configuration of the site.

Figure 4:
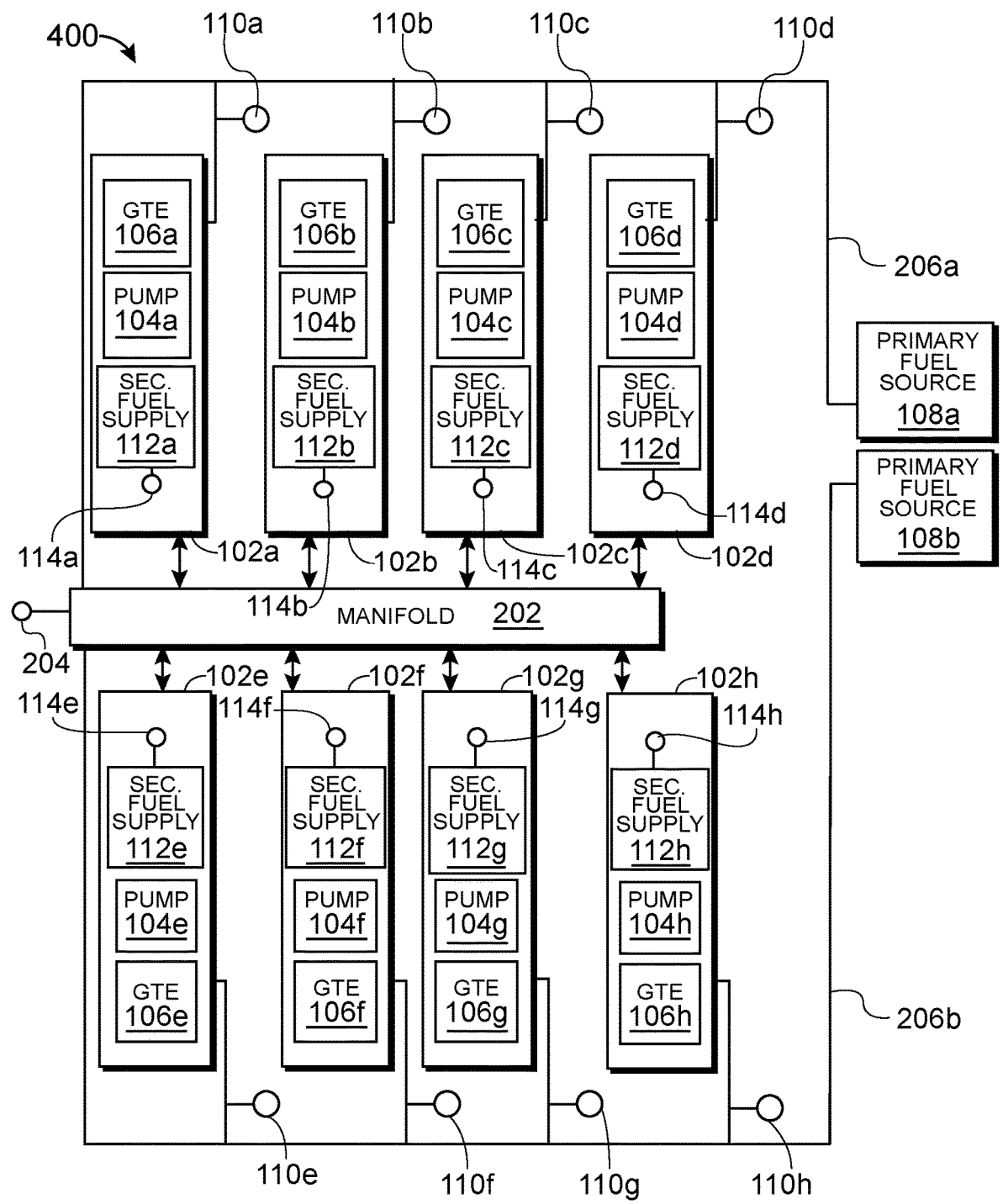
FIG. 4 is a schematic diagram of yet another example fuel distribution system according to embodiments of the disclosure.

FIG. 4 is a schematic diagram of yet another example fuel distribution system 400 provided in association with a plurality or fleet of hydraulic fracturing units 102 according to embodiments of the disclosure, for example, at least similar to those shown in FIGS. 2 and 3. The example fuel distribution system 400 shown in FIG. 4 is a daisy chain-type arrangement and includes two dedicated primary fuel sources 108a and 108b, each providing a single primary fuel supply connection to two subsets of the hydraulic fracturing units 102a-102d and 102e-102h, respectively. This example arrangement may provide relatively reduced flexibility of operation and relatively higher fuel pressure variability across hydraulic fracturing units 102a-102h, but may be relatively more cost effective, for example, because each set of hydraulic fracturing units 102a-102h may be served by a single piping connection from the respective primary fuel sources 108a and 108b.

The exemplary fuel distribution systems 200, 300, and 400 depicted in FIGS. 2-4 are not intended to limit the arrangements or configurations that may be used in association with the hydraulic fracturing units 102 of the system 100. One skilled in the art will appreciate that the choice of fuel distribution system configuration may depend on a number of factors, such as site layout, capital cost, and/or operation cost considerations, among other factors.

Figure 5:
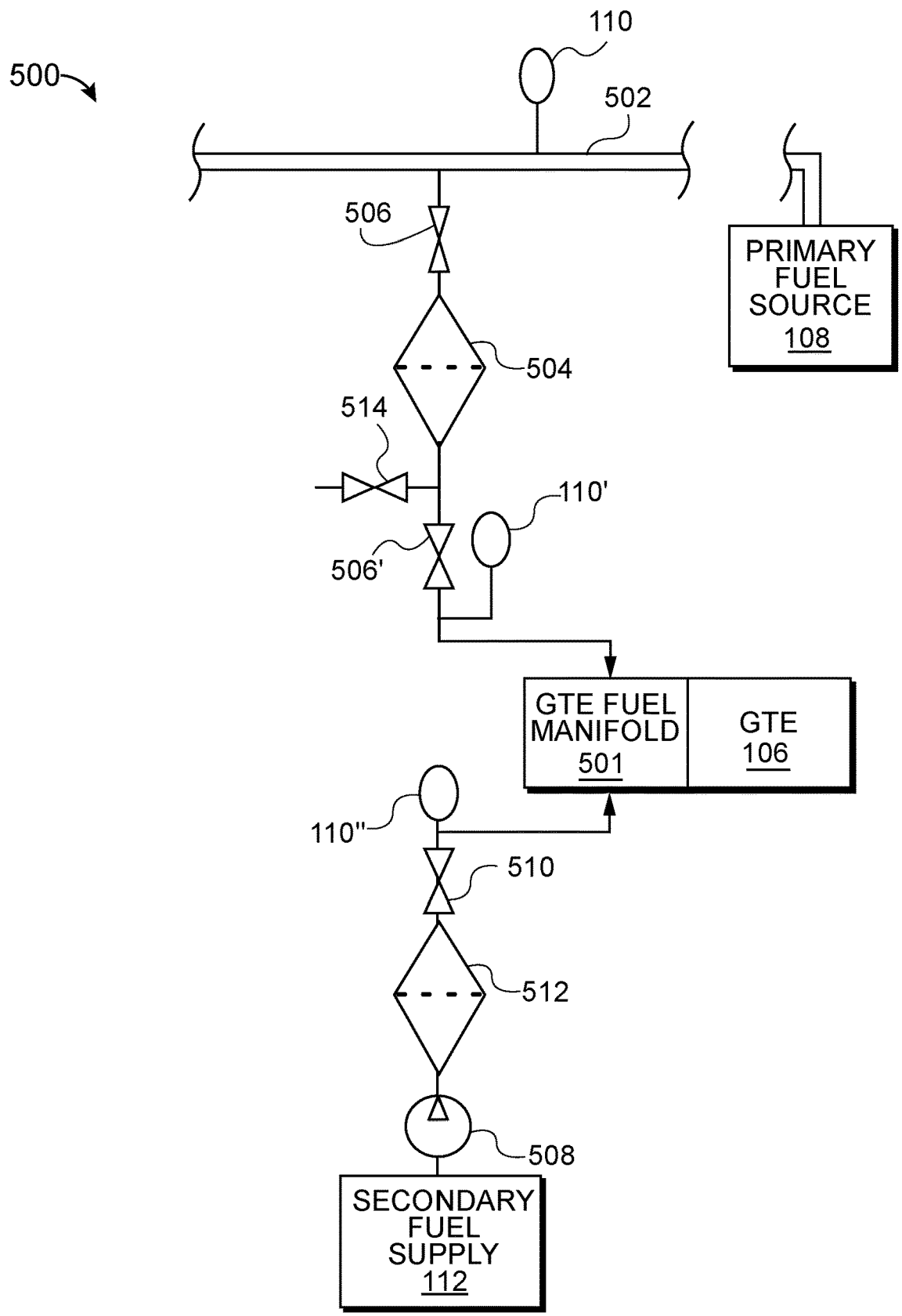
FIG. 5 is a schematic diagram of an example piping arrangement for supplying primary fuel and secondary fuel to a gas turbine engine according to embodiments of the disclosure.

FIG. 5 is a schematic diagram of an example piping arrangement 500 for supplying primary fuel and secondary fuel to a GTE 106 according to embodiments of the disclosure. In the example shown, the GTE 106 includes or is associated with a GTE fuel manifold 501 configured to accept either or both primary fuel from the primary fuel source 108 and secondary fuel from the secondary fuel supply 112 for operation of the GTE 106 using, in some examples, the primary fuel, the secondary fuel, or a combination of both the primary fuel and the secondary fuel. In the example shown, the piping arrangement 500 includes a fuel line 502 for providing flow communication between the primary fuel source 108 and the GTE fuel manifold 501. The piping arrangement 500 can be utilized in the system 100 in combination with a fuel distribution system, such as, for example, any one of the example fuel distribution systems 200, 300, or 400 shown in FIGS. 2-4, and/or or other types of fuel distribution systems. For example, the fuel line 502 may supply primary fuel from one or more of the primary fuel sources shown in FIGS. 2-4 to the GTE 106 associated with one of the hydraulic fracturing units 102.

Between the primary fuel source 108 and the GTE fuel manifold 501, a filter 504 is provided and configured to filter particulates, water, and/or other fuel contaminates from the primary fuel upstream of the GTE fuel manifold 501 to reduce the likelihood of, or prevent, damage to the GTE 106. The filter 504 may be a coalescing filter, although other types of filters are contemplated, for example, depending on the particulates and contamination expected in the primary fuel and/or the fuel line 502.

In the example piping arrangement 500 shown in FIG. 5, a first primary sensor 110 (e.g., a pressure transducer) is provided upstream of the GTE 106, and a second primary sensor 110' (e.g., a pressure transducer) is provided downstream of the filter 504. In some examples, the first primary sensor 110 and the second primary sensor 110' may be configured to generate one or more signals indicative of the fuel pressure at each of the first primary sensor 110 and the second primary sensor 110'. The controller 116 may be configured to receive the one or more signals and determine a fuel pressure drop across the filter 504. In some examples, if the pressure drop across the filter 504 rises above a pressure drop set point, it may be an indication that the filter 504 is at least partially obstructed or clogged, which may prevent the GTE 106 from receiving a sufficient amount of the primary fuel to operate at a desired output (e.g., full capacity), for example, if the fuel pressure is insufficient or is below a minimum threshold required for operation at the desired output.

In some examples, if this situation is encountered, the controller 116 may be configured to cause the GTE 106 to operate using secondary fuel from the secondary fuel supply 112 instead of operating the GTE 106 using primary fuel from the primary fuel source 108. For example, the controller 116 may communicate with a primary valve 506 and cause the primary valve 506 to close, thereby shutting off fuel flow from the primary fuel source 108 to the GTE 106. (FIG. 5 shows the primary valve 506 in an open condition.) The controller 116 may also communicate with a pump 508 between the secondary fuel supply 112 and/or a secondary valve 510 (shown in an open condition) and cause the pump 508 to operate to supply secondary fuel from the secondary fuel supply 112 through the secondary valve 510 in the open condition to the GTE 106. In some examples, the controller 116 may communicate with the secondary valve 510 to cause the secondary valve 510 to open and provide flow communication between the secondary fuel supply 112 and the GTE fuel manifold 501, thereby switching operation of the GTE 106 from using primary fuel from the primary fuel source 108 to operation using secondary fuel from the secondary fuel source 112, which may be associated with the hydraulic fracturing unit 102 to which the GTE 106 is coupled. This may facilitate continued operation of the GTE 106 using the secondary fuel while the filter 504 is serviced (e.g., cleaned, flushed, and/or unclogged) and/or replaced. As shown in FIG. 5, the piping arrangement 500 may also include a filter 512 between the secondary fuel supply 112 and the GTE fuel manifold 501 and configured to filter particulates, water, and/or other fuel contaminates from the secondary fuel upstream of the GTE 106 to reduce the likelihood of, or prevent, damage to the GTE 106. In some examples, a second primary valve 506' (shown in the open condition in FIG. 5) may be provided to prevent secondary fuel from flowing to the filter 504 by changing to a closed condition when secondary fuel is supplied to the GTE 106. In some examples, a secondary sensor 110" may be provided between the secondary valve 510 and the GTE fuel manifold 501 and may be configured to generate signals indicative of fuel pressure associated with the secondary fuel upstream of the GTE fuel manifold 501.

In some examples, the system 100 may be configured to supply fuel to a plurality or fleet of GTEs 106 connected to respective pumps 104 associated with a hydraulic fracturing system including a plurality or fleet of hydraulic fracturing units 102. One or more of the GTEs 106 may be configured to routinely operate using a supply of primary fuel supplied by a primary fuel source 108. The operation of the hydraulic fracturing units 102 including the GTEs 106 may be controlled via the controller 116. In some examples, the hydraulic fracturing units 102 and/or GTEs 106 may be semi-autonomously or fully-autonomously controlled via the controller 116. The controller 116 may include memory that contains computer-executable instructions capable of receiving signals from one or more of the primary sensors 110 and/or one or more of the secondary sensors 114 associated with each of the hydraulic fracturing units 102.

For example, one or more of the primary sensors 110 may generate one or more signals indicative that the one or more of the primary fuel sources 108 is not supplying a sufficient amount of primary fuel to operate one or more of the GTEs 106 at a desired output. In some examples, this may be an indication that the fuel pressure or fuel flow rate to one or more of the GTEs 106 is insufficient. For example, the one or more signals may provide an indication that the fuel pressure associated with one or more of the GTEs 106 falls below a set point (e.g., a previously defined set point). For example, if the fuel pressure of the supply of primary fuel for normal operation at a desired output is 250 pounds per square inch gauge (psig), and the fuel pressure drops below a low-end set point of, for example, 180 psig, the primary sensor 110 may be configured to generate one or more signals providing an indication of the low fuel pressure condition, and based at least in part on the one or more signals, the controller 116 may be configured to determine the low fuel pressure condition and generate an alarm indicating the low fuel pressure condition. In some examples, the controller 116 may be configured to initiate a timer and increase a data sampling rate associated with sensor data received from one or more of the primary sensors 110 and/or one or more of the secondary sensors 114 associated with one or more of the GTEs 106 experiencing a lower fuel pressure than required to operate at the desired output. For example, if the normal data sampling rate for data from the primary sensors 110 and/or the secondary sensors 114 is 500 milliseconds, the data sampling rate may be increased to 250 milliseconds after receipt of a signal providing an indication that the fuel pressure is below the low-end set point. In some examples, the data sampling rate may be increased by a factor of, for example, 1.5, 2, 3, 4, or 5.

In some examples, indication of fuel pressure falling below the low-end set point may be based on a primary fuel pressure process. For example, the primary pressure data from the primary sensors 110 may be collected and subdivided into two sample blocks. In some examples, the sampling rate increase, as described above, may be implemented when two consecutive sample blocks meet any one of the following criteria: 60% of the sample blocks drop a predetermined amount X below the low-end set point, or 40% of the sample blocks drop Y psi below the low-end set point. The values provided above are examples, and other values are contemplated. Actual values of sample blocks as well as the values of X and Y may be determined based on field testing or by other empirical and/or theoretical (e.g., mathematical) methods. In some examples, the threshold (or set-point) may be configurable via revisions of the control system logic and function blocks within the logic.

If the fuel pressure of primary fuel, as indicated by one or more of the primary sensors 110, remains below the low-end set point after the timer has reached a predetermined end time, the controller 116 may be configured to identify the hydraulic fracturing unit 102 having the greatest supply of secondary fuel (e.g., the greatest supply of diesel fuel) in its associated secondary fuel supply 112 (e.g., fuel tank). This identification may be performed based at least partially on input from the secondary sensors 114, which may be configured to indicate a level or volume of secondary fuel in a respective secondary fuel supply 112. In some examples, once the controller 116 identifies the hydraulic fracturing unit 102 having the greatest amount of secondary fuel in its associated secondary fuel supply 112, the controller 116 may inhibit flow communication (or cease flow communication) between the primary fuel source 108 and the GTE 106 associated with the primary sensor 110 indicating insufficient fuel pressure and in some instances, cause secondary fuel in the secondary fuel supply 112 associated with the GTE 106 to be supplied to the GTE 106 to supplement or replace the primary fuel supplied to the GTE 106, such that the GTE 106 may operate at the desired output using the secondary fuel in place of the primary fuel. In some examples, the controller 116 may be configured to perform this process semi- or fully-autonomously.

In some examples, the controller 116 may be configured to determine whether any of the remaining GTEs 106 are being supplied with primary fuel at an insufficient level (e.g., at an insufficient fuel pressure) associated with the remaining GTEs 106 of the remaining hydraulic fracturing units 102 of the plurality or fleet of hydraulic fracturing units 102. In some examples, the above-outlined example process may be repeated for one or more (e.g., all) of the remaining hydraulic fracturing units 102. In a fracturing system including a plurality of hydraulic fracturing units 102, if the pressure of the primary fuel supplied to the hydraulic fracturing units 102 remains below the designated set point for more than one hydraulic fracturing unit 102 after the first hydraulic fracturing unit 102 has been switched from an operation using primary fuel to an operation using secondary fuel, the remaining hydraulic fracturing units 102 having the greatest amount of secondary fuel remaining in the respective secondary fuel supply 112 will be switched (e.g., via the controller 116) from operation using primary fuel to operation using secondary fuel. In some examples, if more than 50% of the hydraulic fracturing units 102 are operating using secondary fuel, the controller 116 and/or the associated remote terminal units 118 may be configured to cause one or more of the hydraulic fracturing units 102 to cycle through operating using secondary fuel to maintain the desired level of output, for example, until the secondary fuel supplies 112 reach a point at which the level of secondary fuel remaining in the respective secondary fuel supply 112 falls to, for example, 10% or less of the capacity of a fuel tank containing the secondary fuel supply 112. At this point, in some examples, the controller 116 may be configured to discontinue operation of all the hydraulic fracturing units 102 operating using secondary fuel, such that only hydraulic fracturing units 102 operating using primary fuel remain operating.

In some examples, once a hydraulic fracturing unit 102 is switched to operation using secondary fuel, the hydraulic fracturing unit 102 may remain operating using secondary fuel, for example, until one of the following two conditions are met: (1) the hydraulic fracturing unit 102 has used more than a predetermined amount its secondary fuel supply 112, or (2) the fuel pressure of the primary fuel returns to a desired operating pressure (e.g., a fuel pressure above the low-end set point). When the first condition is determined by the controller 116, the controller 116 may be configured to switch operation of a different one or more of the hydraulic fracturing units 102 from operation using primary fuel to operation using secondary fuel and switch the initial hydraulic fracturing unit 102 from operation using secondary fuel to operation using primary fuel. For example, the predetermined amount may be, for example, 30% capacity or less, 25% capacity or less, 20% capacity or less, or 15% or less capacity. When the second condition is determined by the controller 116, the controller 116 may receive one or more signals from a corresponding primary sensor 110 indicating that the fuel pressure of primary fuel supplied to the hydraulic fracturing unit 102 is above a high set point. In some such instances, the controller 116 may be configured to initiate a second timer, and when the fuel pressure of primary fuel continues to be above the high set point after the second timer has elapsed, the controller 116 may be configured to cause the hydraulic fracturing unit 102 to operate using the primary fuel from the primary fuel source 108 instead of operating using secondary fuel from the corresponding secondary fuel supply 112. The controller 116 may be configured to thereafter return the data sampling rate to the original data sampling rate used when primary fuel is supplied from the primary fuel source 108, for example, during standard operation.

In some examples, for the hydraulic fracturing units 102 operating using secondary fuel, the controller 116 may be configured to monitor secondary fuel levels of the corresponding secondary fuel supplies. When the controller 116 receives a signal indicating that the secondary fuel level in the corresponding secondary fuel supply is below a minimum secondary fuel level set point, the controller 116 may be configured to cause the hydraulic fracturing unit 102 to cease operation.

Similarly, in some examples, the controller 116 may be configured to determine, based at least in part on a primary signal received from one or more of the primary sensors 110, that the primary fuel source 108 is supplying an insufficient amount of primary fuel to operate one of the plurality of GTEs 106, or more of the GTEs 106, at the desired output (e.g., full capacity output). For example, a primary sensor 110 associated with one or more of the plurality of GTEs 106 (e.g., a primary sensor 110 associated with each of the GTEs 106) may be configured to generate a primary signal indicative of an ability of a primary fuel source 108 to supply an amount of primary fuel sufficient to operate the plurality of GTEs 106 (e.g., each of the GTEs 106) at a desired output may generate one or more signals indicative of a fuel pressure, and the controller 116 may receive the one or more signals and determine whether the fuel pressure has fallen below a predetermined set point, which may correspond to a previously determined supply pressure consistent with an inability of one or more of the GTEs 106 to operate at a desired output using the primary fuel from the primary fuel source 108.

The controller 116, in some examples, may be configured to further determine, based at least in part on secondary signals generated by the secondary sensors 114 indicative of an amount of secondary fuel available from the secondary fuel supplies 112 associated with each of the plurality of GTEs 106, that the amount of secondary fuel available from a first one of the secondary fuel supplies 112 associated with a first of the plurality of GTEs 106 is greater than an amount of secondary fuel available from each of a remainder of the secondary fuel supplies 112 associated with a remainder of the plurality of GTEs 106. For example, a plurality of secondary sensors 114, each of which is associated with one of the plurality of GTEs 106, may be configured to generate a secondary signal indicative of an amount of secondary fuel available from a secondary fuel supply 112 associated with each of the plurality of GTEs 106. The secondary sensors 114 may generate the one or more secondary signals, and the controller 116 may be configured to receive the secondary signals and determine or identify, based at least in part on the secondary signals, that a first one of the secondary fuel supplies 114 associated with a corresponding first one of the plurality of GTEs 106, has a greater amount of secondary fuel available than the remaining secondary fuel supplies 114 associated with each of the other remaining GTEs 106.

In some examples, under such circumstances, the controller 116 may be configured to cause a primary valve 506 (see FIG. 5) of the plurality of primary valves 506 to inhibit flow communication between the primary fuel source 108 and the first of the plurality of GTEs 106. For example, each of a plurality of primary valves 506 may be provided and configured to control flow communication between the primary fuel source 108 and one of the plurality of GTEs 106. The controller 116 may communicate with one or more primary valves 106 associated with the first GTE 106 and cause the one or more primary valves 506 to close, thereby inhibiting or shutting-off flow communication between the primary fuel source 108 and the first GTE 106. In some examples, this may be performed gradually, for example, as explained below. In some examples, the GTE fuel manifold 501 may begin switching to operation using the secondary fuel prior to the one or more primary valves 506 closing. For example, secondary fuel from the secondary fuel supply 112 may already be in flow communication with the GTE fuel manifold 501, and the GTE fuel manifold 501 may be configured to begin switching to using secondary fuel prior to the one or more primary valves 506 closing.

The controller 116 may also be configured to cause a supply of secondary fuel from a first secondary fuel supply 112 associated with the first GTE 106 to supply secondary fuel to the first GTE 106. For example, the controller 116 may communicate with a pump 508 (see FIG. 5) configured to pump the secondary fuel from a secondary fuel supply 112 associated with the first GTE 106, and cause the pump 508 to operate by activating the pump 508. In some examples, the controller 116 may also communicate with a secondary valve 510 (see FIG. 5) configured to control flow communication between the secondary fuel supply 112 and the first GTE 106, and cause the secondary valve 510 to open, thereby permitting secondary fuel to be supplied to the first GTE 106. This may be performed gradually, for example, before and/or during closing of the primary valve 506, which results in switching operation of the first GTE 106 from primary fuel to secondary fuel. In some examples, this may be performed prior to, concurrently, substantially simultaneously, and/or following shutting-off flow of the primary fuel to the first GTE 106.

After causing the primary valve 506 to inhibit flow communication between the primary fuel source 108 and the first of the GTEs 106, based at least in part on the primary signal, the controller 116 may be configured to determine whether the primary fuel source 108 is supplying a sufficient amount of the primary fuel to operate the remainder of the plurality of GTEs 106 at the desired output (e.g., at full capacity of each of the GTEs 106). In some examples, this may include the controller 116 receiving primary signals from one or more of the primary sensors 110 (e.g., all of the primary sensors 110 associated with each of the remaining GTEs 106) and determining whether any of the remaining GTEs 106 are receiving insufficient primary fuel to operate at the desired output. In some examples, one or more of such primary signals may be indicative of an insufficient fuel pressure.

In some examples, if the controller 116 determines that the primary fuel source 108 is not supplying a sufficient amount of the primary fuel to operate the remainder of the plurality of GTEs 106 at the desired output, the controller 116 may be configured to determine, based at least in part on the secondary signals from the secondary sensors 114, that the amount of secondary fuel available from a second secondary fuel supply 112 associated with a second of the plurality of GTEs 106 is greater than an amount of secondary fuel available from each of a second remainder of the secondary fuel supplies 112 associated with a second remainder of the GTEs 106. For example, the controller 116 may determine whether, after switching the first GTE 106 to operation using secondary fuel from its associated secondary fuel supply 112, any of the remaining GTEs 106 are receiving insufficient primary fuel to operate at the desired output. In some instances, switching the first GTE 106 to the secondary fuel may result in the remaining GTEs 106 receiving sufficient fuel to operate at the desired output. However, if one or more of the remaining GTEs 106 are not receiving sufficient primary fuel to operate at the desired output (e.g., the fuel pressure drops below the low-end set point), the controller 116 may be configured to determine, based at least in part on the primary signals received from the primary sensors 110 associated with the remaining GTEs 106, that one or more of the remaining GTEs 106 is receiving insufficient primary fuel from the primary fuel source 108 to operate at the desired output.

In some such examples, the controller 116 may be configured to cause a primary valve 506 of the plurality of primary valves 506 to inhibit flow communication between the primary fuel source 108 and the second of the plurality of GTEs 106. For example, the controller 116 may communicate with one or more primary valves 506 associated with the second GTE 106 and cause the one or more primary valves 506 to close, thereby inhibiting or shutting-off flow communication between the primary fuel source 108 and the second GTE 106. In some examples, this may be performed gradually.

The controller 116 may also be configured to cause supply of secondary fuel from the second secondary fuel supply 112 to the second GTE 106. For example, the controller 116 may communicate with the pump 508 configured to pump the secondary fuel from a secondary fuel supply 112 associated with the second GTE 106 and cause the pump 508 to operate by activating the pump 508. In some examples, the controller 116 may also communicate with a secondary valve 510 configured to control flow communication between the secondary fuel supply 112 and the second GTE 106, and cause the secondary valve 510 to open, thereby permitting secondary fuel to be supplied to the second GTE 106. This may be performed gradually. In some examples, this may be performed prior to, concurrently, substantially simultaneously, and/or following shutting-off flow of the primary fuel to the second GTE 106.

In some examples, this process may be repeated, for example, until the controller 116 determines that the primary fuel source 108 is providing sufficient fuel to operate the remaining GTEs 106 still operating using the primary fuel at the desired output (e.g., at full capacity). In some examples, it may be desirable to operate as many of the GTEs 106 as possible using the primary fuel, and thus, the controller 116 may be configured to individually and sequentially switch the GTEs 106 from operation using primary fuel to operation using secondary fuel, until the primary fuel source 108 is capable of supplying a sufficient amount of primary fuel to the GTEs 106 to operate at the respective desired output levels, with the remainder of the GTEs 106 operating using the secondary fuel supplied by their respective secondary fuel supplies 112. By switching GTEs 106 having the greatest amount of secondary fuel available in their respective secondary fuel supplies 112 to operate using secondary fuel, the duration of uninterrupted operation of the plurality of GTEs 106 may be increased and/or maximized.

In some examples, the controller 116 may be configured to continue to monitor operation of the GTEs 106, for example, at the original data sampling rate and/or at the increased data sampling rate, and determine when the primary fuel source 108 has sufficient capacity to operate the remainder of the plurality of GTEs 106 at the desired output, wait a period of time (e.g., five minutes, ten minutes, or fifteen or more minutes) after the determination, and determine whether (1) the primary fuel source 108 continues to supply a sufficient amount of the primary fuel to operate the remainder of the plurality of GTEs 106 at the desired output, or (2) the primary fuel source 106 has insufficient capacity to operate the remainder of the plurality of GTEs 106 at the desired output. In some examples, the controller 116 may continue to receive the primary signals generated by the primary sensors 110 and make these determinations.

If the controller 116 determines that the primary fuel source 108 continues to supply a sufficient amount of the primary fuel to operate the remainder of the plurality of GTEs 106 at the desired output the controller 116 may also be configured to cease supply of secondary fuel from the first secondary fuel supply 112 to the first GTE 106. In some examples, the controller 116 may check to determine whether the primary fuel source 108 has increased its output to return to operating the first GTE 106 using primary fuel from the primary fuel source 108. If so, the controller 116 may cause the primary valve 506 of the plurality of primary valves 506 to allow flow communication between the primary fuel source 108 and the first GTE 108, for example, such that the first GTE 106 is returned to operation using primary fuel supplied by the primary fuel source 108. In some examples, this process may be repeated for each GTE 106 that has been switched to operation using secondary fuel to see if one or more of such GTEs 106 may be returned to operation using primary fuel.

In some examples, it the controller 116 determines that the primary fuel source 108 has insufficient capacity to operate the remainder of the plurality of GTEs 106 at the desired output, the controller 116 may be configured to further determine, based at least in part on the secondary signals from the secondary sensors 114, that the amount of secondary fuel available from a second secondary fuel supply 112 associated with a second of the plurality of GTEs 106 is greater than an amount of secondary fuel available from each of a second remainder of the secondary fuel supplies 112 associated with a second remainder of GTEs 106. For example, the controller 116 may determine whether, after switching the first GTE 106 to operation using secondary fuel from its associated secondary fuel supply 112, any of the remaining GTEs 106 are receiving insufficient primary fuel. In some instances, switching the first GTE 106 to the secondary fuel may result in the remaining GTEs 106 receiving sufficient fuel to operate at the desired output. However, if one or more of the remaining GTEs 106 are not receiving sufficient primary fuel to operate at the desired output (e.g., the fuel pressure drops below a low-end set point), the controller 116 may be configured to determine, based at least in part on the primary signals received from the primary sensors 110 associated with the remaining GTEs 106, that one or more of the remaining GTEs 106 is receiving insufficient primary fuel from the primary fuel source 108 to operate at the desired output.

In some examples, if the controller 116 determines that the primary fuel source 108 has insufficient capacity to operate the remainder of the plurality of GTEs 106 at the desired output, the controller 116 may be configured to cause a primary valve 506 associated with the second GTE 106 to inhibit (e.g., shut-off) flow communication between the primary fuel source 108 and a second GTE of the plurality of GTEs 106, for example, in a manner at least similar to that described above.

The controller 116 may also be configured to cause supply of secondary fuel from the second secondary fuel supply 112 to the second GTE 106, for example, in a manner at least similar to that described above. In some examples, the controller 116 may be configured to make a new determination about whether the primary fuel source 108 is providing a sufficient amount of fuel to all the GTEs 106 operating using primary fuel.

In this example manner, the controller 116 may determine that one or more of the GTEs 106 is not receiving a sufficient amount of primary fuel from the primary fuel source 108 to operate at the desired output. The controller 116 may also identify a GTE 106 from the plurality of GTEs 106 that has the greatest amount of secondary fuel available in its respective secondary fuel supply 112 to operate its associated GTE 106, and switch operation of the identified GTE 106 from primary fuel to the secondary fuel supplied by its associated secondary fuel supply 112. Thereafter, the controller 116 may determine whether, following the switch and optionally waiting a period of time, any of the remaining GTEs 106 have insufficient primary fuel to operate at the desired output. If so, the controller 116 may identify an additional GTE 106, from among the remaining GTEs 106 operating on primary fuel, having the greatest amount of secondary fuel available in its respective secondary fuel supply 112, and switch operation of the identified additional GTE 106 from primary fuel to the secondary fuel. This may continue until all the remaining GTEs 106 that have not been switched to operation using secondary fuel are operable at the desired output using the primary fuel. Once all the remaining GTEs 106 are operable at the desired output using the primary fuel, the controller 116 may individually and/or sequentially restore operation of the GTEs 106 from operation using secondary fuel to operation using primary fuel, so long as the primary fuel source 108 supplies sufficient primary fuel to operate the restored GTEs 106. For example, after each of the GTEs 106 are restored to operation using primary fuel, the controller 116 may determine whether the GTEs 106 operating using primary fuel are all receiving a sufficient amount of primary fuel to operate at the desired output. If so, the controller 116 may restore an additional GTE 106 back to operation using primary fuel and determine again whether the GTEs 106 operating using primary fuel are all receiving a sufficient amount of primary fuel to operate at the desired output. In some examples, so long as the GTEs 106 operating using primary fuel continue receiving a sufficient amount of primary fuel to operate at the desired output, the controller 116 may continue to restore GTEs 106 back to operation using the primary fuel, or until all the GTEs 106 are operating using the primary fuel. If, on the other hand, the controller 116 determines that less than all the GTEs 106 are operable using the primary fuel, it may cause operation of as few of the GTEs 106 as possible using the secondary fuel, for example, until the supply of primary fuel is sufficient to operate all the GTEs 106 using the primary fuel.

In yet another example, the controller 116 may be configured to determine that one or more of the GTEs 106 is receiving insufficient primary fuel from the primary fuel source 108 and switch operation of at least some (e.g., all) of the GTEs 106 to operation using secondary fuel supplied by the respective secondary fuel sources 114, and thereafter, restore operation of the GTEs 106 to primary fuel, for example, as outlined below, and/or manage operation of the GTEs 106 using a combination of primary fuel and secondary fuel. In some examples, the controller 116 may be configured to perform this semi- or fully-autonomously. In some examples, one or more of the plurality of GTEs 106 may be coupled to a pump 104 of a hydraulic fracturing unit 102, and a plurality of the hydraulic fracturing units 102 may be incorporated into a hydraulic fracturing system 100 for fracturing a subterranean formation.

For example, the controller 116 may be configured to determine, based at least in part on one or more primary signals, that the primary fuel source 108 does not have an ability to supply an amount of primary fuel sufficient to operate the all of the plurality of GTEs 106 at the desired output (e.g., full capacity). For example, the controller 116 may receive the one or more primary signals and determine whether the fuel pressure has fallen below a predetermined low-end set point, which may correspond to a previously determined supply pressure consistent with an inability of one or more of the GTEs 106 to operate at a desired output using the primary fuel from the primary fuel source.

In some such examples, the controller 116 may be configured to cause one or more primary valves 506 and/or 506' (see FIG. 5) configured to control flow communication between the primary fuel source 108 and the plurality of GTEs 106 to inhibit or shut-off flow communication between the primary fuel source 108 and the plurality of GTEs 106 (e.g., inhibit or shut-off flow of primary fuel to all the GTEs 106). For example, a plurality of primary valves 506 may be provided and configured to control flow communication between the primary fuel source 108 and each of respective ones of the plurality of GTEs 106. The controller 116 may communicate with one or more of the primary valves 506 and cause the one or more primary valves 506 to close, thereby inhibiting or shutting-off flow communication between the primary fuel source 108 and each of the GTEs 106. In some examples, this may be performed gradually as described previously herein.

The controller 116, in some examples, may also be configured to cause supply of secondary fuel from a plurality of secondary fuel supplies 112 to each of the plurality of GTEs 106, where each of the plurality of secondary fuel supplies 112 is associated with one of the plurality of GTEs 106. For example, the controller 116 may communicate with one or more pumps 508 (see FIG. 5) configured to pump secondary fuel from each of a plurality of secondary fuel supplies 112, each associated with one of the plurality of GTEs 106 and cause the pump(s) 508 to operate to supply secondary fuel to each of the GTEs 106. In some examples, the controller 116 may also communicate with a plurality of secondary valves 510 (see FIG. 5) configured to control flow communication between the respective secondary fuel supplies 112 and the respective GTEs 106, and cause the secondary valves 510 to open, thereby permitting secondary fuel to be supplied to each of the GTEs 106 from the respective secondary fuel supplies 112. This may be performed gradually as described previously herein. In some examples, this may be performed prior to, concurrently, substantially simultaneously, and/or following shutting-off flow of the primary fuel to the GTEs 106. Thereafter, in some examples, at least for a period of time (e.g., five minutes, ten minutes, or fifteen or more minutes), the controller 116 cause operation of the plurality of GTEs 106 at the desired output (e.g., full capacity) using the secondary fuel.

In some examples, the controller 116 may be further configured to cause flow communication between the primary fuel source 108 and one or more of the plurality of GTEs 106. For example, the controller 116 may be configured to individually and/or sequentially cause the GTEs 106 to switch from operation using the secondary fuel to operation using the primary fuel from the primary fuel source 108. This may include communicating with the pump 508 and in some examples, the secondary valve 510, associated with one of the GTEs 106 to cease supply of the secondary fuel to the GTE 106. This may also include opening the primary valve 506 associated with the GTE 106 to restore flow communication between the primary fuel source 108 and the GTE 106, and operating the GTE 106 using the primary fuel.

The controller 116 in some examples may also be configured to determine, based at least in part on one or more of the primary signals, whether the primary fuel source 108 has an ability to supply an amount of primary fuel sufficient to operate the GTE 106 restored to operation using the primary fuel at the desired output. For example, after restoration of supply of primary fuel to the GTE 106, the controller 116 may be configured to receive one or more primary signals from a primary sensor 110 associated with the GTE 106 and, based at least in part on the one or more primary signals, determine whether the primary fuel source 108 is able to supply a sufficient amount of fuel (e.g., the fuel pressure is above a low-end set point) to operate the GTE 106 at the desired output.

The controller 116 may be configured to thereafter, based at least in part on determining that the primary fuel source 108 has an ability to supply an amount of primary fuel sufficient to operate the one GTE 106 at the desired output, cause flow communication between the primary fuel source 108 and one or more additional GTEs 106 of the plurality of GTEs 106. For example, the controller 116 may be configured to individually and/or sequentially restore supply of the primary fuel to additional GTEs 106 of the plurality of GTEs 106, for example, in a manner at least similar to described above.

The controller 116 may also be configured to, based at least in part on one or more primary signals, determine whether the primary fuel source 108 has an ability to supply an amount of primary fuel sufficient to operate the GTEs 106 that have been restored to operation using the primary fuel source 108 at the desired output. For example, after restoring supply of the primary fuel to each of the additional GTEs 106, the controller 116 may be configured to determine whether the primary fuel source 108 has an ability to supply an amount of primary fuel sufficient to operate each of the GTEs 106 to which operation using the primary fuel has been restored, for example, in a manner at least similar to described above. Thus, in some examples, the controller 116 may be configured to return operation of GTEs 106 using secondary fuel to operation using primary fuel until the controller 116 determines that the primary fuel source 108 is unable to supply a sufficient amount of primary fuel to operate all the restored GTEs 106 at the desired output.

For example, the controller 116 be configured to cause sequential restoration of flow communication between the primary fuel source 108 and each of the plurality of GTEs 106, until the controller 116 determines, based at least in part on one or more primary signals from the primary sensors 110, that the primary fuel source 108 lacks the ability to supply an amount of primary fuel sufficient to operate at the desired output (e.g., at substantially full capacity) a portion (e.g., all) of the plurality of GTEs 106 to which flow communication with the primary fuel source has been restored. For example, the controller 116 may receive a plurality of primary signals from the primary sensors associated with each of the GTEs 106 to which operation using the primary fuel has been restored and determine whether the primary fuel source is able to supply a sufficient amount of the primary fuel to the restored GTEs 106 to operate the restored GTEs 106 at the desired output. In some examples, this may be repeated until either (1) the controller 116 determines that the primary fuel source 108 lacks the ability to supply an amount of primary fuel sufficient to operate the restored GTEs 106 at the desired output, or (2) all the GTEs 106 have been restored to operation using primary fuel from the primary fuel source 108. If (1), the controller 116 may continue to operate at least a subset of the GTEs 106 still operating using secondary fuel from the one or more corresponding secondary fuel supplies 112, for example, as described in more detail below. If (2), the controller 116 may be configured to determine whether the primary fuel source 108 is able to supply an amount of primary fuel sufficient to operate all the plurality of GTEs 106 at the desired output.

In some examples, the controller 116 may be configured to manage flow communication between the primary fuel source 108 and each of the plurality of GTEs 106, for example, such that a first portion of the plurality of GTEs 106 are supplied with primary fuel from the primary fuel source 108 and a second portion of the plurality of GTEs 106 are supplied with secondary fuel from a portion of the plurality of secondary fuel supplies 112 associated with each of the second portion of the GTEs 106, such that the plurality of GTEs 106 are operated at the desired output. For example, the controller 116 may be configured to restore operation of a portion of the GTEs 106 using the primary fuel, while maintaining operation of the remainder of the GTEs 106 using the secondary fuel from the respective secondary fuel supplies 112.

In some examples, the controller 116 may be configured to periodically cause: (1) a first subset of the first portion of the plurality of GTEs 106 to switch from using primary fuel from the primary fuel source 108 to each using secondary fuel from the secondary fuel supply 112 associated with each of the plurality of the first subset of GTEs 106. The controller 116 may be configured to further cause a second subset of the second portion of the plurality of GTEs 106 to switch from using secondary fuel from the secondary fuel supply 112 associated with each of the plurality of the second subset of GTEs 106 to operation using primary fuel from the primary fuel source 108. In some examples, the number of the plurality of GTEs 106 in the first subset may equal the number of the plurality of the GTEs 106 in the second subset. In some examples, the first portion of the plurality of GTEs 106 and the second portion of the plurality of GTEs 106 may include all of the plurality of GTEs 106.

The controller 116, in some examples, may be configured to further include waiting a period of time, such as, for example, five minutes, ten minutes, fifteen minutes, or more. For example, the controller 116 may initiate a clock to wait a period of time before taking further action. Thereafter, the controller 116 may be configured to cause at least some (e.g., all) of the first subset of GTEs 106 to switch from operation using secondary fuel to operation using primary fuel, and cause an equal number of the second subset of GTEs 106 to switch from operation using primary fuel to operation using secondary fuel, for example, as previously described herein.

Thereafter, the controller 116 may be configured to further cause another subset of the first portion of the plurality of GTEs 106 to switch operation using primary fuel to operation using secondary fuel. The controller 116 may cause this action, for example, as previously described herein. The controller 116 may also be configured to cause another subset of the second portion of the plurality of GTEs 106 to switch from operation using secondary fuel to operation using primary fuel. Similar to above, the controller 116 may cause waiting a period of time, such as, for example, five minutes, ten minutes, fifteen minutes, or more, by initiating a clock to wait the period of time before taking further action.

In some examples, the controller 116 may be configured to cause repeat of the above-noted operations, for example, such that different subsets of the GTEs 106 alternate between operation using primary fuel and operation using secondary fuel. For example, once the number (e.g., the maximum number) of the plurality of GTEs 106 that may be supplied with the primary fuel for operation at the desired output has been determined and/or the number of GTEs 106 that must be operated using the secondary fuel while all the GTEs 106 are operated at the desired output, the type of fuel (e.g., the primary fuel or the secondary fuel) used by the GTEs 106 may be periodically switched, for example, according to a routine that switches some GTEs 106 operating using the primary fuel to operating using the secondary fuel, and switching some GTEs 106 operating using the secondary fuel to operating using the primary fuel. In some examples, the number of GTEs 106 being switched between operation using the different types of fuel may be equal. For example, if two GTEs 106 operating using primary fuel are switched to operation using secondary fuel, two GTEs 106 operating using secondary fuel may be switched to operation using primary fuel. In some examples, such switching may occur following a predetermined amount of time (e.g., five minutes, ten minutes, or fifteen or more minutes). In some examples, such switching may occur such that most, or all, of the GTEs 106 are switched between operation using the two types of fuel, for example, according to a repeating schedule. In some examples, this may result in less wear on the GTEs 106, for example, if the GTEs operate more efficiently, with higher output, and/or with less wear, operating using the primary fuel relative to operation using the secondary fuel.

In some examples, the controller 116 may be configured to manage flow communication between the primary fuel source 108 and each of the plurality of GTEs 106, until the controller 116 determines, based at least in part on one or more primary signals, that the primary fuel source 108 is supplying sufficient primary fuel to operate all of the plurality of GTEs 106 at the desired output. For example, the controller 116 may receive the primary signals and determine that it is possible to operate all of the GTEs 106 using the primary fuel, and at such time, the controller 116 may cause all the GTEs 106 to operate using the primary fuel. For example, a cause preventing the primary fuel source 108 from supplying a sufficient amount of primary fuel to operate all the GTEs 106 using the primary fuel may be identified and mitigated and/or eliminated. For example, a source of the primary fuel may restore sufficient primary fuel and/or pressure to the system for the system to operate solely using primary fuel, and/or a compromised fuel filter 504 preventing sufficient fuel pressure and/or flow may be cleaned or replaced, thus correcting a problem preventing a sufficient amount of primary fuel from being supplied to the GTEs 106 to operate them all simultaneously at the desired output.

FIGS. 6, 7A, 7B, 8A, and 8B are a block diagrams of example methods for controlling supply of fuel to a plurality of GTEs according to embodiments of the disclosure illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

Figure 6:
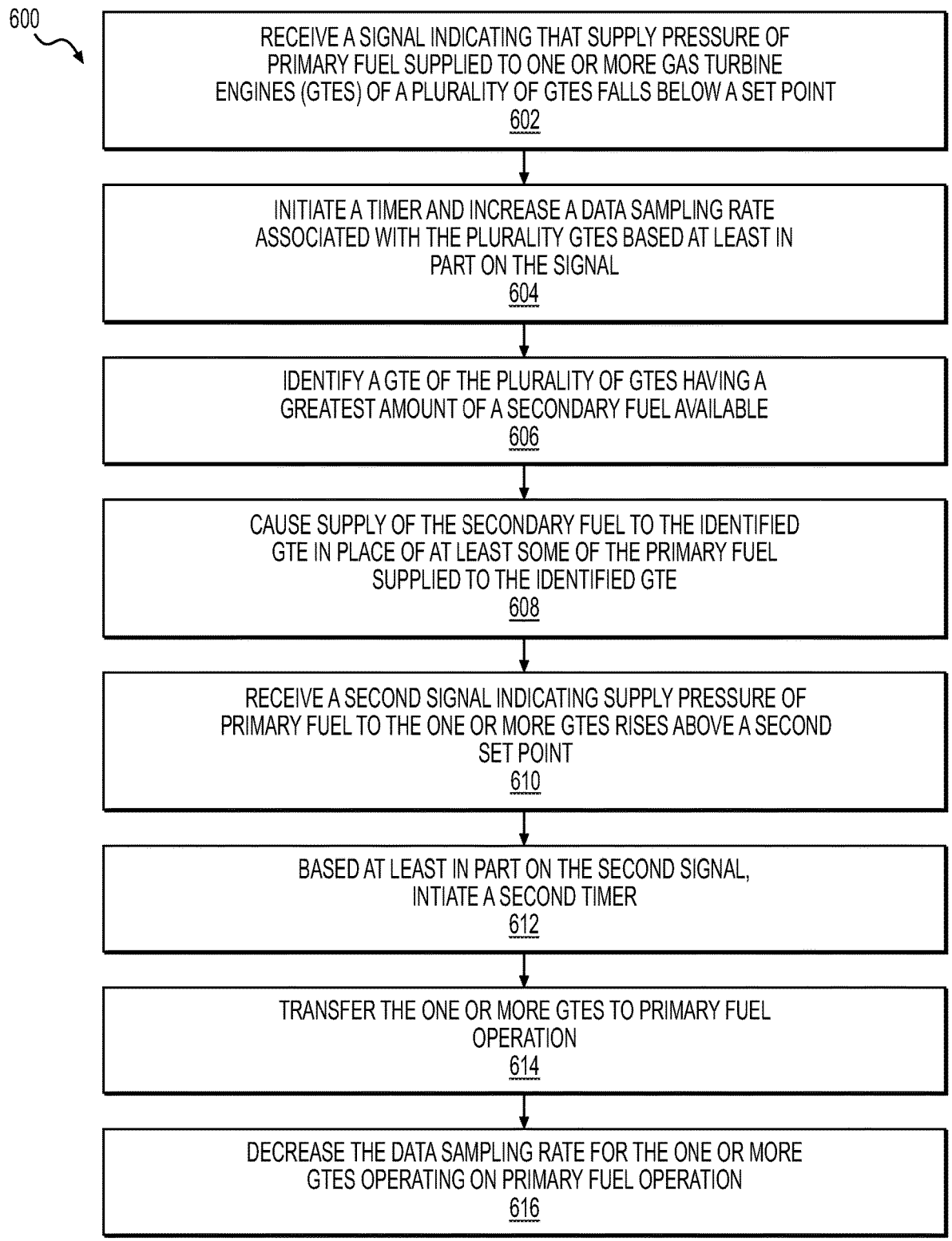
FIG. 6 is a block diagram of an example method for supplying fuel to a plurality of gas turbine engines according to embodiments of the disclosure.

FIG. 6 is a flow diagram of an example method 600 for controlling fuel supply to a plurality or fleet of GTEs associated with pumps in a hydraulic fracturing system according to embodiments of the disclosure. In some examples, the method 600 may be performed semi- or fully-autonomously. The method 600 may be utilized in association with various systems, such as, for example, the systems 100, 200, 300, 400, and/or 500 illustrated in FIGS. 1, 2, 3, 4, and/or 5.

The example method 600, at 602, may include receiving a signal indicating that supply pressure of primary fuel supplied to one or more GTEs connected to a pump of a plurality of pumps falls below a set point. For example, a primary sensor may generate one or more signals indicative of the supply pressure, and a controller may receive the one or more signals and determine whether the supply pressure has fallen below a predetermined set point, which may correspond to a previously determined supply pressure consistent with an inability of one or more of the GTEs to operate at a desired output (e.g., at full capacity) using the primary fuel.

The example method 600, at 604, may further include initiating a timer and increasing a data sampling rate associated with the plurality GTEs, for example, based at least in part on the signal. For example, if under normal operating conditions the controller samples data at a first sampling rate, the controller may start a timer and sample the data at a faster sampling rate, for example, as described previously herein.

The example method 600, at 606, may also include, when the supply pressure of primary fuel to the one or more GTEs remains below the set point when the timer reaches a predetermined end time, identifying a GTE of the plurality of GTEs having a greatest amount of a secondary fuel available. For example, a secondary sensor associated with each of the GTEs may be configured to generate one or more signals indicative of an amount of secondary fuel available to each of the GTEs from a secondary fuel supply associated with each of the GTEs. The controller may receive the signals and identify the GTE corresponding to the secondary fuel supply having the greatest amount of secondary fuel from among all of the secondary fuel supplies.

At 608, the example method 600 may further include causing supply of the secondary fuel to the identified GTE in place of at least some of the primary fuel (e.g., all of the primary fuel) supplied to the identified GTE. For example, the controller may communicate with one or more primary valves associated with the identified GTE and cause the one or more primary valves to close, thereby shutting-off flow communication between the primary fuel source and the identified GTE. In some examples, this may be performed gradually. The controller may also cause secondary fuel from the secondary fuel supply associated with the identified GTE to be supplied to the identified GTE. For example, the controller may communicate with a pump configured to pump the secondary fuel from the secondary fuel supply to the identified GTE and cause the pump to operate. In some examples, the controller may also communicate with a secondary valve configured to control flow communication between the secondary fuel supply and the identified GTE, and cause the secondary valve to open, thereby permitting secondary fuel to be supplied to the identified GTE. This may be performed gradually. In some examples, this may be performed prior to, concurrently, substantially simultaneously, and/or following shutting-off flow of the primary fuel to the identified GTE.

In some examples of the method 600, 602 through 608 may be repeated for one or more of the remaining GTEs of the plurality or fleet of GTEs associated with the pumps of the hydraulic fracturing system, for example, when the controller determines that the primary fuel supply is unable to supply an amount of primary fuel to a GTE to operate the GTE at the desired output.

At 610, the example method 600 may also include receiving a second signal indicating that supply pressure of primary fuel to one or more GTEs rises above a second set point. For example, one or more of the primary sensors may receive a signal indicative that the primary fuel source is supplying sufficient fuel pressure to operate the GTEs using the primary fuel.

At 612, the example method 600 may further include, based at least in part on the indication at 610, initiating a second timer.

At 614, the example method 600 may further include transferring operation of the one or more GTEs to primary fuel operation, for example, if the supply pressure of primary fuel to the one or more GTEs remains above the second set point when the second timer reaches a second predetermined end time. For example, if the controller receives the one or more signals from the primary sensor associated with the one or more GTEs, and the one or more signals indicates that supply pressure is greater than the second set point after monitoring the supply pressure for the predetermined period of time, it indicates that the primary fuel source is suppling an amount of primary fuel sufficient to operate the one or more GTEs, and thus, the controller may cause the one or more GTEs to return to operation using primary fuel from the primary fuel source. This may include opening the primary valve providing flow communication between the primary fuel source and the one or more GTEs, and closing a secondary valve between the secondary fuel supply and the one or more GTEs and/or ceasing operation of a pump configured to supply the secondary fuel to the one or more GTEs.

At 616, the example method may further include decreasing the data sampling rate for the one or more GTEs operating using primary fuel. For example, the controller may return the sampling to the sampling rate prior to 604 above.

Figure 7A:
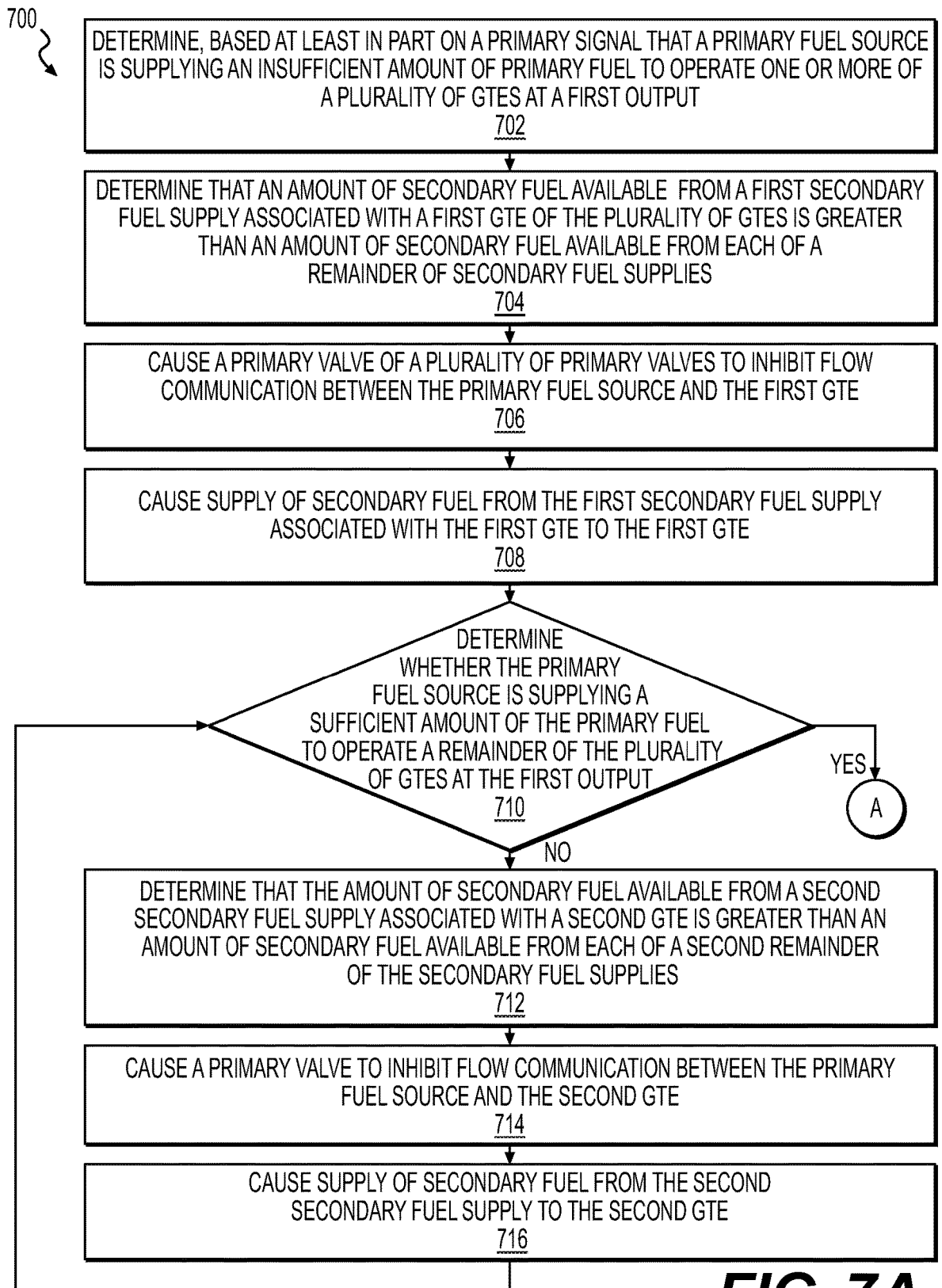
FIG. 7A is a block diagram of an example method for supplying fuel to a plurality of gas turbine engines according to embodiments of the disclosure.
Figure 7B:
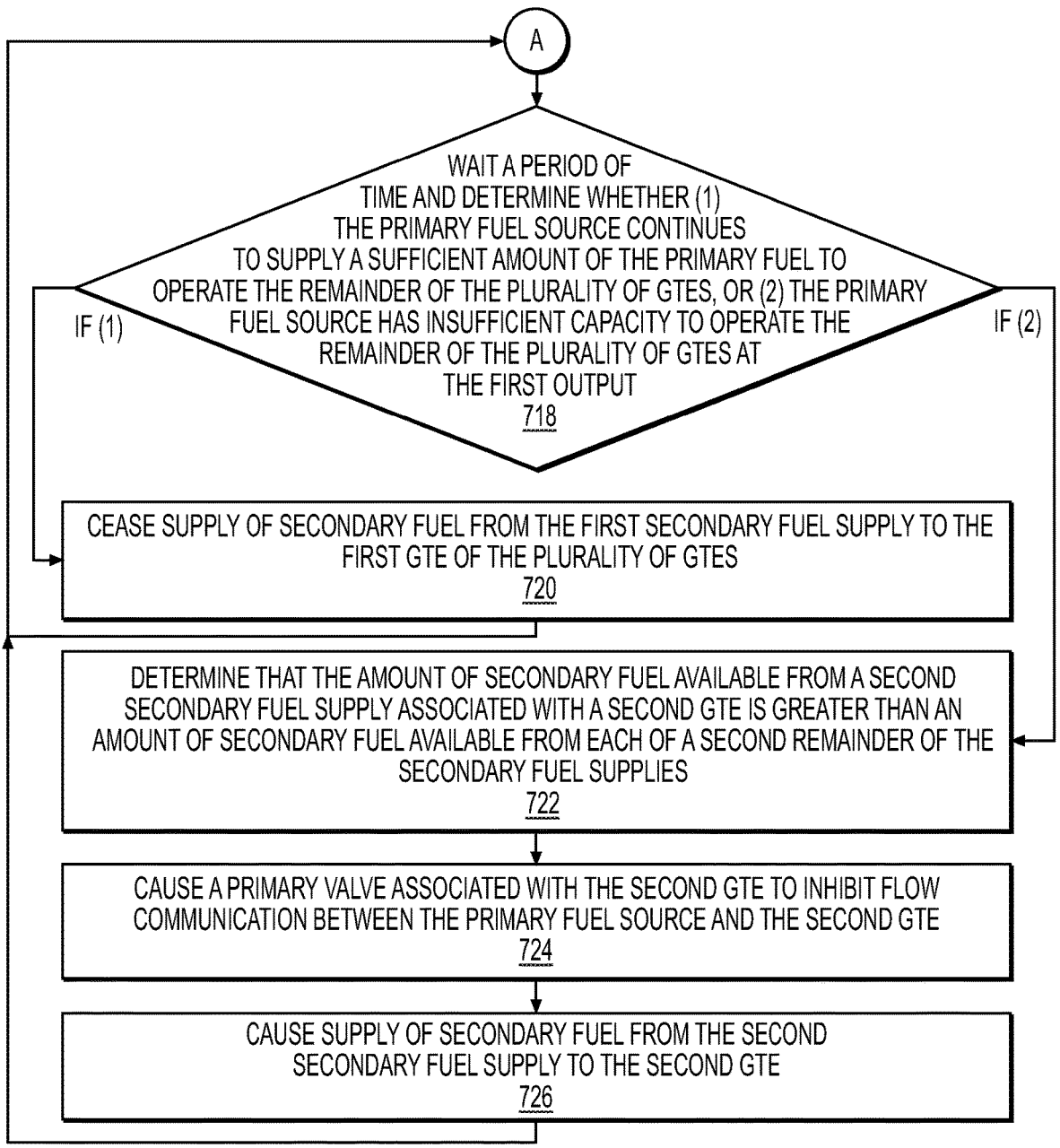
FIG. 7B is a continuation of the block diagram of FIG. 7A.

FIGS. 7A and 7B are a flow diagram of an example method 700 for supplying fuel to a plurality or fleet of GTEs according to embodiments of the disclosure. In some examples, the method 700 may be performed semi- or fully-autonomously. The method 700 may be utilized in association with various systems, such as, for example, the systems 100, 200, 300, 400, and/or 500 illustrated in FIGS. 1, 2, 3, 4, and/or 5. For example, one or more of the plurality of GTEs may be coupled to a pump of a hydraulic fracturing unit, and a plurality of the hydraulic fracturing units may be incorporated into a hydraulic fracturing system for fracturing a subterranean formation.

At 702, the example method 700 may include determining, based at least in part on a primary signal, that a primary fuel source is supplying an insufficient amount of primary fuel to operate one or more of the plurality of GTEs at the first output, such as a desired output associated with operation of the GTE (e.g., full capacity output). For example, a primary sensor associated with one or more of the plurality of GTEs (e.g., a primary sensor associated with each of the GTEs) may be configured to generate a primary signal indicative of an ability of a primary fuel source to supply an amount of primary fuel sufficient to operate the plurality of GTEs (e.g., each of the GTEs) at a first output may generate one or more signals indicative of a fuel pressure, and a controller may receive the one or more signals and determine whether the fuel pressure has fallen below a predetermined set point, which may correspond to a previously determined supply pressure consistent with an inability of one or more of the GTEs to operate at a desired output (e.g., full capacity) using the primary fuel from the primary fuel source.

At 704, the example method 700 may further include determining, based at least in part on secondary signals indicative of an amount of secondary fuel available from a secondary fuel supply associated with each of the plurality of GTEs, that the amount of secondary fuel available from a first secondary fuel supply associated with a first of the plurality of GTEs is greater than an amount of secondary fuel available from each of a remainder of the secondary fuel supplies associated with a remainder of the plurality of GTEs. For example, a plurality of secondary sensors, each of which is associated with one of the plurality of GTEs, may be configured to generate a secondary signal indicative of an amount of secondary fuel available from a secondary fuel supply associated with each of the plurality of GTEs. The secondary sensors may generate the one or more secondary signals, and the controller may be configured to receive the secondary signals and determine or identify, based at least in part on the secondary signals, that a first one of the secondary fuel supplies associated with a corresponding first one of the plurality of GTEs, has a greater amount of secondary fuel available than the remaining secondary fuel supplies associated with each of the other remaining GTEs.

The example method 700, at 706, may further include causing a primary valve of the plurality of primary valves to inhibit flow communication between the primary fuel source and the first of the plurality of GTEs. For example, each of a plurality of primary valves may be provided and configured to control flow communication between the primary fuel source and one of the plurality of GTEs. The controller may communicate with one or more primary valves associated with the first GTE and cause the one or more primary valves to close, thereby inhibiting or shutting-off flow communication between the primary fuel source and the first GTE. In some examples, this may be performed gradually.

At 708, the example method 700 may further include causing supply of secondary fuel from a first secondary fuel supply associated with the first GTE to the first GTE of the plurality of GTEs. For example, the controller may communicate with a pump configured to pump the secondary fuel from a secondary fuel supply associated with the first GTE and cause the pump to operate. In some examples, the controller may also communicate with a secondary valve configured to control flow communication between the secondary fuel supply and the first GTE, and cause the secondary valve to open, thereby permitting secondary fuel to be supplied to the first GTE. This may be performed gradually. In some examples, this may be performed prior to, concurrently, substantially simultaneously, and/or following shutting-off flow of the primary fuel to the first GTE.

The example method 700, at 710, may further include determining, after causing the primary valve to inhibit flow communication between the primary fuel source and the first of the GTEs, based at least in part on the primary signal, whether the primary fuel source is supplying a sufficient amount of the primary fuel to operate the remainder of the plurality of GTEs at the first output (e.g., at full capacity of each of the GTEs). In some examples, this may include the controller receiving primary signals from one or more of the primary sensors (e.g., all of the primary sensors associated with each of the remaining GTEs) and determining whether any of the remaining GTEs are receiving insufficient primary fuel to operate at the desired output. In some examples, one or more of such primary signals may be indicative of an insufficient fuel pressure.

At 712, the example method 700 may include, when it has been determined at 710 that the primary fuel source is not supplying a sufficient amount of the primary fuel to operate the remainder of the plurality of GTEs at the first output, determining, based at least in part on the secondary signals, that the amount of secondary fuel available from a second secondary fuel supply associated with a second of the plurality of GTEs is greater than an amount of secondary fuel available from each of a second remainder of the secondary fuel supplies associated with a second remainder of GTEs. For example, the controller may determine whether, after switching the first GTE to operation using secondary fuel from its associated secondary fuel supply, any of the remaining GTEs are receiving insufficient primary fuel. In some instances, switching the first GTE to the secondary fuel may result in the remaining GTEs receiving sufficient fuel to operate at the desired output. However, if one or more of the remaining GTEs are not receiving sufficient primary fuel to operate at the desired output (e.g., the fuel pressure drops below a set point), the controller may be configured to determine, based at least in part on the primary signals received from the primary sensors associated with the remaining GTEs, that one or more of the remaining GTEs is receiving insufficient primary fuel from the primary fuel source to operate at the desired output.

At 714, the example method 700 may include causing a primary valve of the plurality of primary valves to inhibit flow communication between the primary fuel source and the second of the plurality of GTEs. For example, the controller may communicate with one or more primary valves associated with the second GTE and cause the one or more primary valves to close, thereby inhibiting or shutting-off flow communication between the primary fuel source and the second GTE. In some examples, this may be performed gradually.

At 716, the example method may include causing supply of secondary fuel from the second secondary fuel supply to the second GTE of the plurality of GTEs. For example, the controller may communicate with a pump configured to pump the secondary fuel from a secondary fuel supply associated with the second GTE and cause the pump to operate. In some examples, the controller may also communicate with a secondary valve configured to control flow communication between the secondary fuel supply and the second GTE, and cause the secondary valve to open, thereby permitting secondary fuel to be supplied to the second GTE. This may be performed gradually. In some examples, this may be performed prior to, concurrently, substantially simultaneously, and/or following shutting-off flow of the primary fuel to the second GTE.

In some examples of the method 700, one or more of 710 through 716 may be repeated, for example, until it has been determined that the primary fuel source is providing sufficient fuel to operate the remaining GTEs still operating using the primary fuel at the desired output (e.g., at full capacity). In some examples, it may be desirable to operate as many of the GTEs of the plurality of GTEs as possible using the primary fuel, and thus, the method may include individually and sequentially switching the GTEs from operation using primary fuel to operation using secondary fuel, until the primary fuel source is capable of supplying a sufficient amount of primary fuel to the GTEs still operating using the primary fuel to operate at the respective desired output levels, with the rest of the GTEs operating using the secondary fuel supplied by their respective secondary fuel supplies. By switching GTEs having the greatest amount of secondary fuel available in their respective secondary fuel supplies to operate using secondary fuel, the duration of uninterrupted operation of the plurality of GTEs may be increased and/or maximized.

As shown in FIG. 7B, the example method 700, at 718, may further include, when it has been determined at 710 the primary fuel source has sufficient capacity to operate the remainder of the plurality of gas turbine engines at the first output, waiting a period of time and determining whether (1) the primary fuel source continues to supply a sufficient amount of the primary fuel to operate the remainder of the plurality of GTEs at the first output, or (2) the primary fuel source has insufficient capacity to operate the remainder of the plurality of GTEs at the first output. In some examples, the controller may continue to receive the primary signals from the primary sensors and make this determination.

The example method, at 720, may further include, if at 718 it is determined that the primary fuel source continues to supply a sufficient amount of the primary fuel to operate the remainder of the plurality of GTEs at the first output, ceasing supply of secondary fuel from the first secondary fuel supply to the first GTE of the plurality of GTEs. In some examples, the controller may determine whether the primary fuel has increased its output to return to operating the first GTE using primary fuel from the primary fuel source. If so, the controller may cause the primary valve of the plurality of primary valves to allow flow communication between the primary fuel source and the first GTE, for example, such that the first GTE is returned to operation using primary fuel supplied by the primary fuel source. In some examples, the method 700 may repeat 718 for each GTE that has been switched to operation using secondary fuel to see if one or more of such GTEs may be returned to operation using primary fuel.

The example method 700, at 722, may further include, if at 718 it is determined that the primary fuel source has insufficient capacity to operate the remainder of the plurality of GTEs at the first output, determining, based at least in part on the secondary signals, that the amount of secondary fuel available from a second secondary fuel supply associated with a second of the plurality of GTEs is greater than an amount of secondary fuel available from each of a second remainder of the secondary fuel supplies associated with a second remainder of GTEs. For example, the controller may determine whether, after switching the first GTE to operation using secondary fuel from its associated secondary fuel supply, any of the remaining GTEs are receiving insufficient primary fuel. In some instances, switching the first GTE to the secondary fuel may result in the remaining GTEs receiving sufficient primary fuel to operate at the desired output. However, if one or more of the remaining GTEs are not receiving sufficient primary fuel to operate at the desired output (e.g., the fuel pressure drops below a set point), the controller may be configured to determine, based at least in part on the primary signals received from the primary sensors associated with the remaining GTEs, that one or more of the remaining GTEs is receiving insufficient primary fuel from the primary fuel source to operate at the desired output.

The example method 700, at 724, may further include, if at 718 it is determined that the primary fuel source has insufficient capacity to operate the remainder of the plurality of GTEs at the first output, causing a primary valve associated with the second GTE to inhibit (e.g., shut-off) flow communication between the primary fuel source and a second GTE, for example, in a manner at least similar to 706 above.

The example method 700, at 726, may further include, causing supply of secondary fuel from the second secondary fuel supply to the second GTE, for example, in a manner at least similar to 708 above. In some examples, following 726, the method 700 may return to 718 to make a new determination about whether the primary fuel source is providing a sufficient amount of fuel to all the GTEs operating using primary fuel.

In this example manner, the method may include identifying that one or more of the GTEs is not receiving a sufficient amount of primary fuel from the primary fuel source to operate at the desired output. The method further may include identifying a GTE from the plurality of GTEs that has the greatest amount of secondary fuel available in its respective secondary fuel supply to operate its associated GTE, and switch operation of the identified GTE from primary fuel to the secondary fuel supplied by its associated secondary fuel supply. Thereafter, the method may include determining whether, following the switch and optionally waiting a period of time, any of the remaining GTEs have insufficient primary fuel to operate at the desired output. If so, the method may include identifying a GTE, from among the remaining GTEs operating on primary fuel, having the greatest amount of secondary fuel available in its respective secondary fuel supply, and switching operation of the identified GTE from primary fuel to the secondary fuel. This may continue until all the remaining GTEs still operating using primary fuel are operable at the desired output. Once all the remaining GTEs are operable at the desired output using the primary fuel, the method may include individually and sequentially switching operation of the GTEs from operation using secondary fuel to operation using primary fuel. After each of the GTEs are switched back to operation using primary fuel, the method may include determining whether the GTEs operating using primary fuel are all receiving a sufficient amount of primary fuel to operate at the desired output. If so, the method may include switching an additional GTE back to operation using primary fuel and determining again whether the GTEs operating using primary fuel are all receiving a sufficient amount of primary fuel to operate at the desired output. In some examples, so long as the GTEs operating using primary fuel continue receiving a sufficient amount of primary fuel to operate at the desired output, the method may include continuing to switch GTEs back to operation using the primary fuel, or until all the GTEs are operating using the primary fuel. If, on the other hand, the method determines that less than all the GTEs are operable using the primary fuel, the method may include operating as few of the GTEs as possible using the secondary fuel, for example, until the supply of primary fuel is sufficient to operate all the GTEs using the primary fuel.

Figure 8A:
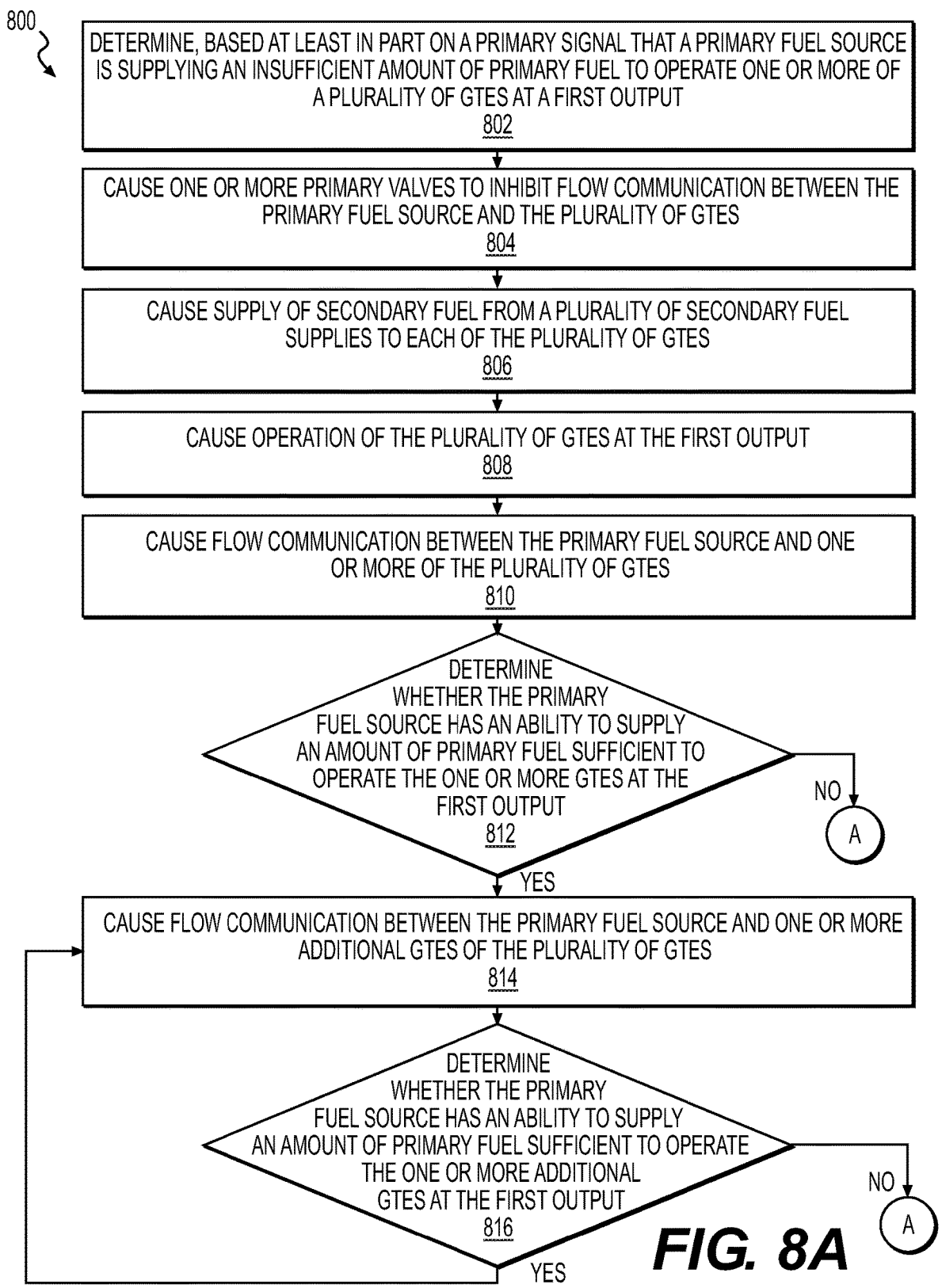
FIG. 8A is a block diagram of an example method for supplying fuel to a plurality of gas turbine engines according to embodiments of the disclosure.
Figure 8B:
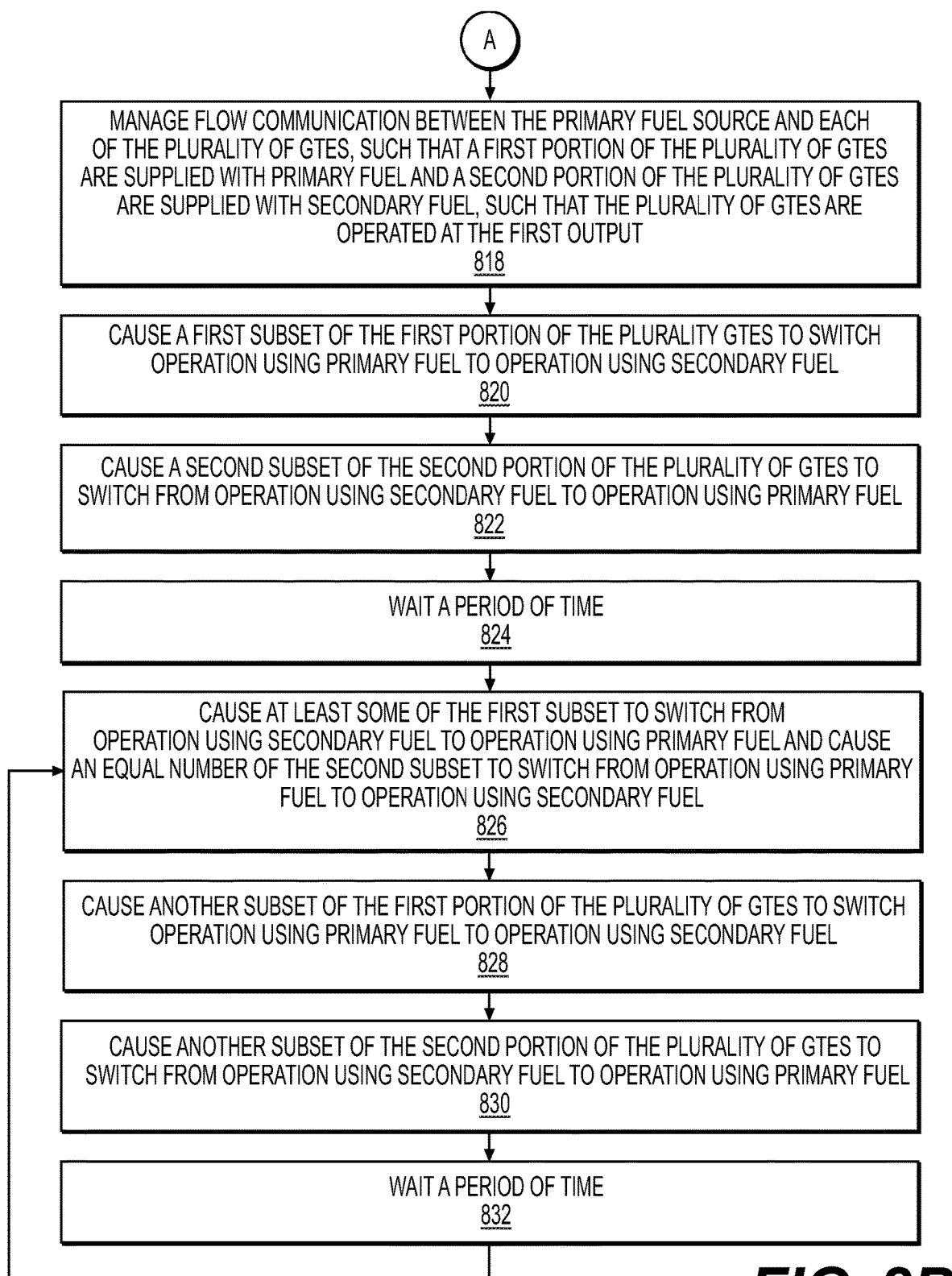
FIG. 8B is a continuation of the block diagram of FIG. 8A.

FIGS. 8A and 8B are a flow diagram of another example method 800 for supplying fuel to a plurality or fleet of GTEs according to embodiments of the disclosure. In some examples, the method 800 may be performed semi- or fully-autonomously. The method 800 may be utilized in association with various systems, such as, for example, the systems 100, 200, 300, 400, and/or 500 illustrated in FIGS. 1, 2, 3, 4, and/or 5. For example, one or more of the plurality of GTEs may be coupled to a pump of a hydraulic fracturing unit, and a plurality of the hydraulic fracturing units may be incorporated into a hydraulic fracturing system for fracturing a subterranean formation.

At 802, the example method 800 may include determining, based at least in part on one or more primary signals, that a primary fuel source does not have an ability to supply an amount of primary fuel sufficient to operate the plurality of GTEs at the first output (e.g., a desired output and/or at full capacity). For example, a primary sensor associated with one or more of the plurality of GTEs (e.g., a primary sensor associated with each of the GTEs) may be configured to generate a primary signal indicative of an ability of a primary fuel source to supply an amount of primary fuel sufficient to operate the plurality of GTEs (e.g., each of the GTEs) at a first output may generate one or more signals indicative of a fuel pressure (e.g., upstream of each of the GTEs). A controller may receive the one or more signals and determine whether the fuel pressure has fallen below a predetermined set point, which may correspond to a previously determined supply pressure consistent with an inability of one or more of the GTEs to operate at a desired output using the primary fuel from the primary fuel source.

At 804, the example method 800 may also include causing one or more primary valves configured to control flow communication between the primary fuel source and the plurality of GTEs to inhibit flow communication between the primary fuel source and the plurality of GTEs (e.g., inhibit or shut-off flow of primary fuel to all the GTEs). For example, a plurality of primary valves may be provided and configured to control flow communication between the primary fuel source and each of respective ones of the plurality of GTEs. The controller may communicate with one or more of the primary valves and cause the one or more primary valves to close, thereby inhibiting or shutting-off flow communication between the primary fuel source and each of the GTEs. In some examples, this may be performed gradually.

The example method 800, at 806 may further include causing supply of secondary fuel from a plurality of secondary fuel supplies to each of the plurality of GTEs, where each of the plurality of secondary fuel supplies is associated with one of the plurality of GTEs. For example, the controller may communicate with one or more pumps configured to pump secondary fuel from each of a plurality of secondary fuel supplies, each associated with one of the plurality of GTEs, and cause the pump(s) to operate to supply secondary fuel to each of the GTEs. In some examples, the controller may also communicate with a plurality of secondary valves configured to control flow communication between the respective secondary fuel supplies and the respective GTEs, and cause the secondary valves to open, thereby permitting secondary fuel to be supplied to each of the GTEs from the respective secondary fuel supplies. This may be performed gradually. In some examples, this may be performed prior to, concurrently, substantially simultaneously, and/or following shutting-off flow of the primary fuel to the GTEs.

At 808, the example method 800 may also include causing operation of the plurality of GTEs at the first output (e.g., full capacity) using the secondary fuel.

At 810, the example method 800 may further include causing flow communication between the primary fuel source and one or more of the plurality of GTEs. For example, the controller may be configured to individually and/or sequentially cause the GTEs to switch from operation using the secondary fuel to operation using the primary fuel from the primary fuel source. This may include communicating with the pump and in some examples, the secondary valve, associated with one of the GTEs to cease supply of the secondary fuel to the GTE. This may also include opening the primary valve associated with the GTE to restore flow communication between the primary fuel source and the GTE, and operating the GTE using the primary fuel.

The example method 800, at 812, may also include determining, based at least in part on one or more of the primary signals, whether the primary fuel source has an ability to supply an amount of primary fuel sufficient to operate the GTE restored to operation using the primary fuel at the first output. For example, after restoration of the primary fuel to the GTE, the controller may be configured to receive one or more primary signals generated by a primary sensor associated with the GTE and, based at least in part on the one or more primary signals, determine whether the primary fuel source is able to supply a sufficient amount of fuel (e.g., the fuel pressure is above a set point) to operate the GTE at the first output.

At 814, the example method 800 may further include, based at least in part on determining that the primary fuel source has an ability to supply an amount of primary fuel sufficient to operate the one or more GTEs at the first output, causing flow communication between the primary fuel source and one or more additional GTEs of the plurality of GTEs. For example, the controller may be configured to individually and/or sequentially restore supply of the primary fuel to additional GTEs of the plurality of GTEs, for example, in a manner at least similar to 810.

The example method 800, at 816, may also include determining, based at least in part on one or more primary signals, whether the primary fuel source has an ability to supply an amount of primary fuel sufficient to operate the GTEs that have been restored to operation using the primary fuel source at the first output. For example, after restoring supply of the primary fuel to each of the additional GTEs, the controller may be configured to determine whether the primary fuel source has an ability to supply an amount of primary fuel sufficient to operate each of the GTEs to which operation using the primary fuel has been restored, for example, in a manner at least similar to 812. Thus, in some examples, the method may return to 814 until the controller determines that the primary fuel source is unable to supply a sufficient amount of primary fuel to operate all the restored GTEs at the first output.

For example, the method 800 may include, following 808, causing individual and/or sequential restoration of flow communication between the primary fuel source and each of the plurality of GTEs until it is determined, based at least in part on one or more primary signals, that the primary fuel source lacks an ability to supply an amount of primary fuel sufficient to operate at the first output (e.g., at substantially full capacity) the portion of the plurality of GTEs to which flow communication with the primary fuel source has been restored. For example, the controller may receive a plurality of primary signals from the primary sensors associated with each of the GTEs to which operation using the primary fuel has been restored and determine whether the primary fuel source is able to supply a sufficient amount of the primary fuel to the restored GTEs to operate the restored GTEs at the desired output. This may be repeated until either (1) the controller determines that the primary fuel source lacks an ability to supply an amount of primary fuel to operate the restored GTEs at the desired output, or (2) all the GTEs have been restored to operation using primary fuel from the primary fuel source. If (1), the method 800 may include continuing to operate at least a subset of the GTEs still operating using secondary fuel from the one or more corresponding secondary fuel supplies, for example, as described with respect to 818 through 832 below. This may be controlled by the controller. If (2), the method 800 may return to 802 to determine whether the primary fuel source is able to supply an amount of primary fuel sufficient to operate all the plurality of GTEs at the first or desired output. This may be performed by the controller, for example, as described herein.

At 818, as shown in FIG. 8B, the example method 800 may include managing flow communication between the primary fuel source and each of the plurality of GTEs, for example, such that a first portion of the plurality of GTEs is supplied with primary fuel from the primary fuel source and a second portion of the plurality of GTEs is supplied with secondary fuel from a portion of the plurality of secondary fuel supplies associated with each of the second portion of the GTEs, such that the plurality of GTEs are operated at the first output. For example, the controller may be configured to restore operation of a portion of the GTEs to using the primary fuel, while maintaining operation of the remainder of the GTEs using the secondary fuel from the respective secondary fuel supplies.

At 820, the example method 800 may further include periodically causing: (1) a first subset of the first portion of the plurality of GTEs to switch from using primary fuel from the primary fuel source to each using secondary fuel from the secondary fuel supply associated with each of the plurality of the first subset. The controller may cause this action, for example, as previously described herein.

At 822, the example method 800 may further include causing a second subset of the second portion of the plurality of GTEs to switch from using secondary fuel from the secondary fuel supply associated with each of the plurality of the second subset of GTEs to operation using primary fuel from the primary fuel source. In some examples, the number of the plurality of GTEs in the first subset may equal the number of the plurality of the GTEs in the second subset. In some examples, the first portion of the plurality of GTEs and the second portion of the plurality of GTEs includes all of the plurality of GTEs. The controller may cause this action, for example, as previously described herein.

At 824, the example method 800 may further include waiting a period of time, such as, for example, five minutes, ten minutes, fifteen minutes, or more. For example, the controller may initiate a clock to wait a period of time before taking further action.

At 826, the method 800 may include causing at least some (e.g., all) of the first subset of GTEs to switch from operation using secondary fuel to operation using primary fuel, and cause an equal number of the second subset of GTEs to switch from operation using primary fuel to operation using secondary fuel. The controller may cause this action, for example, as previously described herein.

At 828, the example method 800 may further include causing another subset of the first portion of the plurality of GTEs to switch operation using primary fuel to operation using secondary fuel. The controller may cause this action, for example, as previously described herein.

At 830, the example method may further include causing another subset of the second portion of the plurality of GTEs to switch from operation using secondary fuel to operation using primary fuel. The controller may cause this action, for example, as previously described herein.

At 832, the example method may further include waiting a period of time, such as, for example, five minutes, ten minutes, fifteen minutes, or more. For example, the controller may initiate a clock to wait a period of time before taking further action.

In some examples, 826 through 832 may be repeated, such that different subsets of the GTEs alternate between operation using primary fuel and operation using secondary fuel. For example, once the number (e.g., the maximum number) of the plurality of GTEs that may be supplied with the primary fuel for operation at the desired output has been determined and/or the number of GTEs that must be operated using the secondary fuel while all the GTEs are operated at the desired output, the type of fuel (e.g., the primary fuel or the secondary fuel) used by the GTEs may be switched, for example, according to a routine that periodically switches some GTEs operating using the primary fuel to operating using the secondary fuel, and switching some GTEs operating using the secondary fuel to operating using the primary fuel. In some examples, the number of GTEs being switched between operation using the different types of fuel may be equal. In other words, if two GTEs operating using primary fuel are switched to operation using secondary fuel, two GTEs operating using secondary fuel may be switched to operation using primary fuel. In some examples, such switching may occur following a predetermined amount of time (e.g., five minutes, ten minutes, fifteen minutes, twenty minutes, or thirty minutes). In some examples, such switching may occur such that most, or all, of the GTEs are switched between operation using the two types of fuel, for example, according to a repeating schedule. In some examples, this may result in less wear on the GTEs, for example, if the GTEs operate more efficiently, with higher output, and/or with less wear, operating using the primary fuel relative to operating using the secondary fuel.

In some examples, method 800 may include managing flow communication between the primary fuel source and each of the plurality of GTEs until it has been determined, based at least in part on one or more primary signals, that the primary fuel source is supplying sufficient primary fuel to operate all of the plurality of GTEs at the first output. For example, the controller may receive the primary signals and determine that it is possible to operate all of the GTEs using the primary fuel, and at such time, the controller may cause all the GTEs to operate using the primary fuel. For example, the cause preventing the primary fuel source from supplying a sufficient amount of primary fuel to operate all the GTEs using the primary fuel may be identified and mitigated and/or eliminated. For example, a source of the primary fuel may restore sufficient primary fuel and/or pressure to the system for the system to operate solely using primary fuel, and/or a compromised fuel filter preventing sufficient fuel pressure and/or flow may be cleaned or replaced, thus correcting a problem preventing a sufficient amount of primary fuel from being supplied to the GTEs to operate them all simultaneously at the desired output.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Figure 9:
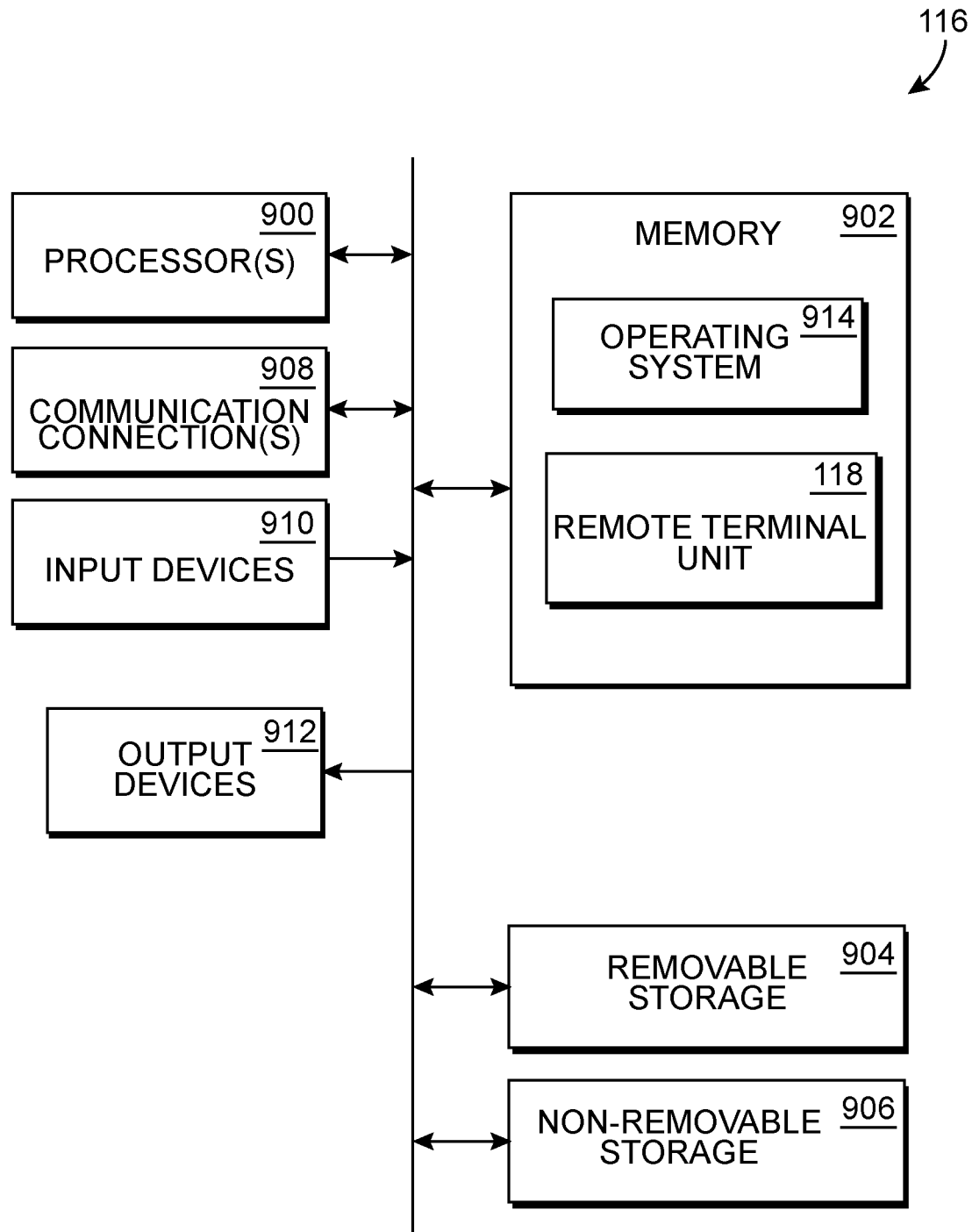
FIG. 9 is a schematic diagram of an example controller configured to control supply of fuel to a plurality of gas turbine engines according to embodiments of the disclosure.

FIG. 9 illustrates an example controller 116 configured for implementing certain systems and methods for supplying fuel to a plurality GTEs (e.g., dual- or bi-fuel GTEs configured to operate using two different types of fuel) according to embodiments of the disclosure, for example, as described herein. The controller 116 may include one or more processor(s) 900 configured to execute certain operational aspects associated with implementing certain systems and methods described herein. The processor(s) 900 may communicate with a memory 902. The processor(s) 900 may be implemented and operated using appropriate hardware, software, firmware, or combinations thereof. Software or firmware implementations may include computer-executable or machine-executable instructions written in any suitable programming language to perform the various functions described. In some examples, instructions associated with a function block language may be stored in the memory 902 and executed by the processor(s) 900.

The memory 902 may be used to store program instructions that are loadable and executable by the processor(s) 900, as well as to store data generated during the execution of these programs. Depending on the configuration and type of the controller 116, the memory 902 may be volatile (such as random access memory (RAM)) and/or non-volatile (such as read-only memory (ROM), flash memory, etc.). In some examples, the memory devices may include additional removable storage 904 and/or non-removable storage 906 including, but not limited to, magnetic storage, optical disks, and/or tape storage. The disk drives and their associated computer-readable media may provide non-volatile storage of computer-readable instructions, data structures, program modules, and other data for the devices. In some implementations, the memory 902 may include multiple different types of memory, such as static random access memory (SRAM), dynamic random access memory (DRAM), or ROM.

The memory 902, the removable storage 904, and the non-removable storage 906 are all examples of computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which may be used to store the desired information and which may be accessed by the devices. Combinations of any of the above should also be included within the scope of computer-readable media.

The controller 116 may also include one or more communication connection(s) 908 that may facilitate a control device (not shown) to communicate with devices or equipment capable of communicating with the controller 116. The controller 116 may also include a computer system (not shown). Connections may also be established via various data communication channels or ports, such as USB or COM ports to receive cables connecting the controller 116 to various other devices on a network. In some examples, the controller 116 may include Ethernet drivers that enable the controller 116 to communicate with other devices on the network. According to various examples, communication connections 908 may be established via a wired and/or wireless connection on the network.

The controller 116 may also include one or more input devices 910, such as a keyboard, mouse, pen, voice input device, gesture input device, and/or touch input device. It may further include one or more output devices 912, such as a display, printer, and/or speakers. In some examples, computer-readable communication media may include computer-readable instructions, program modules, or other data transmitted within a data signal, such as a carrier wave or other transmission. As used herein, however, computer-readable storage media may not include computer-readable communication media.

Turning to the contents of the memory 902, the memory 902 may include, but is not limited to, an operating system (OS) 914 and one or more application programs or services for implementing the features and embodiments disclosed herein. Such applications or services may include a remote terminal unit 118 for executing certain systems and methods for control of a fuel management system (e.g., semi- or full-autonomous control of a fuel management system for bi- or dual-fuel GTEs). The remote terminal unit 118 may reside in the memory 902 or may be independent of the controller 116, for example, as depicted in FIG. 1. In some examples, the remote terminal unit 118 may be implemented by software that may be provided in configurable control block language and may be stored in non-volatile memory. When executed by the processor(s) 900, the remote terminal unit 118 may implement the various functionalities and features associated with the controller 116 described herein.

As desired, embodiments of the disclosure may include a controller 116 with more or fewer components than are illustrated in FIG. 9. Additionally, certain components of the example controller 116 shown in FIG. 9 may be combined in various embodiments of the disclosure. The controller 116 of FIG. 9 is provided by way of example only.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide task, acts, actions, or operations for implementing the functions specified in the block or blocks.

One or more components of the systems and one or more elements of the methods described herein may be implemented through an application program running on an operating system of a computer. They may also be practiced with other computer system configurations, including handheld devices, multiprocessor systems, microprocessor-based or programmable consumer electronics, mini-computers, mainframe computers, and the like.

Application programs that are components of the systems and methods described herein may include routines, programs, components, data structures, etc. that may implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks can be performed by remote processing devices linked through a communications network.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed is:

1. A system for supplying fuel to a plurality of gas turbine engines, the system comprising:
   a primary sensor associated with the plurality of gas turbine engines, the primary sensor configured to generate a primary signal indicative of an ability of a primary fuel source to supply an amount of primary fuel sufficient to operate the plurality of gas turbine engines at a first output;
   a plurality of secondary sensors, each of the plurality of secondary sensors associated with each one of the plurality of gas turbine engines and configured to generate a secondary signal indicative of an amount of secondary fuel available from a plurality of secondary fuel supplies, each of the plurality of secondary fuel supplies associated with each of the plurality of gas turbine engines; and
   a controller in communication with the primary sensor, each of the plurality of secondary sensors, and a plurality of primary valves, each of the plurality of primary valves configured to control flow communication between the primary fuel source and each one of the plurality of gas turbine engines, the controller configured to:
      determine, based at least in part on the primary signal, that the primary fuel source is supplying an insufficient amount of the primary fuel to operate one or more of the plurality of gas turbine engines at the first output;
      determine, based at least in part on the secondary signals, that the amount of the secondary fuel available from a first secondary fuel supply associated with a first gas turbine engine of the plurality of gas turbine engines is greater than the amount of the secondary fuel available from each of a remainder of the plurality of secondary fuel supplies associated with a remainder of the plurality of gas turbine engines;
      cause a primary valve of the plurality of primary valves to inhibit flow communication between the primary fuel source and the first gas turbine engine of the plurality of gas turbine engines; and
      cause supply of the secondary fuel from the first secondary fuel supply to the first gas turbine engine of the plurality of gas turbine engines.

2. The system of claim 1, wherein the controller is further configured to:
   determine, after causing the primary valve to inhibit flow communication between the primary fuel source and the first gas turbine engine of the plurality of gas turbine engines, based at least in part on the primary signal, whether the primary fuel source is supplying a sufficient amount of the primary fuel to operate the remainder of the plurality of gas turbine engines at the first output.

3. The system of claim 2, wherein, when the controller determines the primary fuel source is not supplying the sufficient amount of the primary fuel to operate the remainder of the plurality of gas turbine engines at the first output, the controller is configured to:
   determine, based at least in part on the secondary signals, that the amount of the secondary fuel available from a second secondary fuel supply associated with a second gas turbine engine of the plurality of gas turbine engines is greater than the amount of the secondary fuel available from each of a second remainder of the plurality of secondary fuel supplies associated with a second remainder of the plurality of gas turbine engines;
   cause the primary valve of the plurality of primary valves to inhibit flow communication between the primary fuel source and the second gas turbine engine of the plurality of gas turbine engines; and
   cause supply of the secondary fuel from the second secondary fuel supply to the second gas turbine engine of the plurality of gas turbine engines.

4. The system of claim 2, wherein, when the controller determines the primary fuel source has sufficient capacity to operate the remainder of the plurality of gas turbine engines at the first output, the controller is configured to:
   wait a period of time; and
   one of:
      (1) if, following the period of time, the controller determines that the primary fuel source continues to supply the sufficient amount of the primary fuel to operate the remainder of the plurality of gas turbine engines at the first output, cease supply of the secondary fuel from the first secondary fuel supply to the first gas turbine engine of the plurality of gas turbine engines; and
      cause the primary valve of the plurality of primary valves to allow flow communication between the primary fuel source and the first gas turbine engine of the plurality of gas turbine engines; or
      (2) if, following the period of time, the controller determines that the primary fuel source has insufficient capacity to operate the remainder of the plurality of gas turbine engines at the first output, cause the primary valve to inhibit flow communication between the primary fuel source and a second gas turbine engine of the plurality of gas turbine engines; and
      cause supply of the secondary fuel from the second secondary fuel supply to the second gas turbine engine.

5. The system of claim 1, wherein:
   the primary sensor comprises a plurality of primary sensors, each of the plurality of primary sensors associated with each one of the plurality of gas turbine engines and configured to generate the primary signal indicative of the ability of the primary fuel source to supply the amount of the primary fuel sufficient to operate the plurality of gas turbine engines at the first output; and the controller is configured to determine, based at least in part on the primary signals generated by the plurality of primary sensors, whether the primary fuel source has the ability to supply the amount of the primary fuel sufficient to operate the plurality of gas turbine engines at the first output.

6. The system of claim 5, wherein the controller is configured to cause the plurality of primary valves to inhibit flow communication between the primary fuel source and the plurality of gas turbine engines.

7. A system for supplying fuel to a plurality of gas turbine engines, the system comprising:

a primary sensor associated with the plurality of gas turbine engines, the primary sensor configured to generate a primary signal indicative of an ability of a primary fuel source to supply an amount of primary fuel sufficient to operate the plurality of gas turbine engines at a first output; and a controller in communication with the primary sensor and a plurality of primary valves, each of the plurality of primary valves configured to control flow communication between the primary fuel source and each one of the plurality of gas turbine engines, the controller configured to:

determine, based at least in part on the primary signal, that the primary fuel source does not have the ability to supply the amount of the primary fuel sufficient to operate the plurality of gas turbine engines at the first output;

cause one or more of the primary valves configured to control flow communication between the primary fuel source and the plurality of gas turbine engines to inhibit flow communication between the primary fuel source and the plurality of gas turbine engines;

cause supply of a secondary fuel from a plurality of secondary fuel supplies to each of the plurality of gas turbine engines, each of the plurality of secondary fuel supplies associated with each one of the plurality of gas turbine engines; and cause operation of the plurality of gas turbine engines at the first output using the secondary fuel.

8. The system of claim 7, wherein the controller is further configured to:

cause flow communication between the primary fuel source and one or more of the plurality of gas turbine engines; and determine, based at least in part on the primary signal, whether the primary fuel source has the ability to supply the amount of the primary fuel sufficient to operate the one or more of the plurality of gas turbine engines at the first output.

9. The system of claim 8, wherein the controller is further configured to:

based at least in part on determining that the primary fuel source has the ability to supply the amount of the primary fuel sufficient to operate the one or more of the plurality of gas turbine engines at the first output, cause flow communication between the primary fuel source and at least two of the plurality of gas turbine engines; and determine, based at least in part on the primary signal, whether the primary fuel source has the ability to supply the amount of the primary fuel sufficient to operate the at least two gas turbine engines at the first output.

10. The system of claim 9, wherein the controller is further configured to:

based at least in part on determining that the primary fuel source has the ability to supply the amount of the primary fuel sufficient to operate the at least two gas turbine engines at the first output, cause flow communication between the primary fuel source and at least three of the plurality of gas turbine engines; and determine, based at least in part on the primary signal, whether the primary fuel source has the ability to supply the amount of the primary fuel sufficient to operate the at least three gas turbine engines at the first output.

11. The system of claim 7, wherein the controller is further configured to:

cause sequential restoration of flow communication between the primary fuel source and each of the plurality of gas turbine engines until the controller determines, based at least in part on the primary signal, that the primary fuel source lacks the ability to supply the amount of the primary fuel sufficient to operate at the first output a first portion of the plurality of gas turbine engines to which flow communication with the primary fuel source has been restored; and manage flow communication between the primary fuel source and each of the plurality of gas turbine engines, such that a second portion of the plurality of gas turbine engines is supplied with the primary fuel from the primary fuel source and a third portion of the plurality of gas turbine engines is supplied with the secondary fuel from a portion of the plurality of secondary fuel supplies associated with each of the third portion of the gas turbine engines, such that the plurality of gas turbine engines are operated at the first output.

12. The system of claim 11, wherein the second portion of the plurality of gas turbine engines is a first number of gas turbine engines and the third portion of the plurality of gas turbine engines is a second number of gas turbine engines, and the first number and the second number equals a total number of the plurality of gas turbine engines, and wherein the controller is configured to periodically cause:

(1) a first subset of the second portion of the plurality of gas turbine engines to switch from using the primary fuel from the primary fuel source to each using the secondary fuel from the secondary fuel supply associated with each of the first subset of the second portion of the plurality of gas turbine engines; and (2) a second subset of the third portion of the plurality of gas turbine engines to switch from using the secondary fuel from the secondary fuel supply associated with each of the second subset of the third portion of the plurality of gas turbine engines, wherein a number of the plurality of gas turbine engines in the first subset is equal to a number of the plurality of the gas turbine engines in the second subset.

13. The system of claim 12, wherein the controller is configured to manage flow communication between the primary fuel source and each of the plurality of gas turbine engines until the controller determines, based at least in part on the primary signal, that the primary fuel source is sufficiently supplying the primary fuel to operate the plurality of gas turbine engines at the first output.

14. The system of claim 7, wherein:
the primary sensor comprises a plurality of primary sensors, each of the plurality of primary sensors associated with each one of the plurality of gas turbine engines and configured to generate the primary signal indicative of the ability of the primary fuel source to supply the amount of the primary fuel sufficient to operate each of the plurality of gas turbine engines at the first output; and
the controller is configured to determine, based at least in part on primary signals generated by the plurality of primary sensors, whether the primary fuel source lacks the ability to supply the amount of the primary fuel sufficient to operate each of the plurality of gas turbine engines at the first output.

15. The system of claim 11, wherein the second portion of the plurality of gas turbine engines is the same number as the third portion of the plurality of gas turbine engines.

* * * * *